(12) United States Patent
Asayama et al.

(10) Patent No.: US 10,240,589 B2
(45) Date of Patent: Mar. 26, 2019

(54) PLUNGER ELECTRIC FUEL PUMP

(71) Applicant: TOYOTA JIDOSHA KABUSHIKI KAISHA, Toyota-shi, Aichi-ken (JP)

(72) Inventors: Kazuhiro Asayama, Nagoya (JP); Satoki Takagi, Nisshin (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 203 days.

(21) Appl. No.: 15/476,070

(22) Filed: Mar. 31, 2017

(65) Prior Publication Data

US 2017/0298915 A1  Oct. 19, 2017

(30) Foreign Application Priority Data

Apr. 14, 2016  (JP) .................................. 2016-081141

(51) Int. Cl.
 *F04B 17/04* (2006.01)
 *H02K 21/02* (2006.01)

(52) U.S. Cl.
 CPC ......... *F04B 17/042* (2013.01); *H02K 21/028* (2013.01)

(58) Field of Classification Search
 CPC ..... F04B 17/042; F04B 17/00; H02K 21/021; H02K 21/022; H02K 21/023; H02K 21/024; H02K 21/028
 USPC .......................................... 417/417; 310/191
 See application file for complete search history.

(56) References Cited

U.S. PATENT DOCUMENTS

| 3,286,911 A | * | 11/1966 | Clarke | .................. F04B 25/005 417/254 |
| 2014/0161650 A1 | | 6/2014 | Paweletz et al. | |
| 2017/0074255 A1 | * | 3/2017 | Asayama | ................ F04B 23/06 |

FOREIGN PATENT DOCUMENTS

| JP | S63-255524 A | 10/1988 |
| JP | 2014-117149 A | 6/2014 |
| JP | 2015-081577 A | 4/2015 |
| JP | 2017-053319 A | 3/2017 |

OTHER PUBLICATIONS

U.S. Appl. No. 15/275,917, filed Sep. 26, 2016 in the name of Asayama et al.

* cited by examiner

*Primary Examiner* — Devon C Kramer
*Assistant Examiner* — Christopher J Brunjes
(74) *Attorney, Agent, or Firm* — Oliff PLC

(57) ABSTRACT

A plunger electric fuel pump includes a cylinder; a plunger; a pump body; a movable element to which the plunger is connected; a fixed core provided so as to face the movable element; a rotational core including a permanent magnet; an electric motor configured to rotate the rotational core; and a spring configured to urge the movable element in a direction away from the pump body. The rotational core and the fixed core are provided with a switching portion configured to switch between a first state and a second state when a rotational phase of the rotational core is changed, the first state being a state where the magnetic force of the permanent magnet is not applied to the movable element, the second state being a state where the magnetic force of the permanent magnet is applied to the movable element.

3 Claims, 15 Drawing Sheets

PLUNGER ELECTRIC FUEL PUMP

INCORPORATION BY REFERENCE

The disclosure of Japanese Patent Application No. 2016-081141 filed on Apr. 14, 2016 including the specification, drawings and abstract is incorporated herein by reference in its entirety.

BACKGROUND

1. Technical Field

The disclosure relates to a plunger electric fuel pump.

2. Description of Related Art

There has been known a plunger fuel pump in which fuel in a compression chamber defined by a cylinder and a plunger is pressurized by moving the plunger in the cylinder. For example, a fuel pump described in Japanese Patent Application Publication No. 2014-117149 (JP 2014-117149 A) includes a movable element that is caused to reciprocate by an electromagnet. A piston functioning as a plunger is connected to the movable element, and thus, the fuel pump is electrically operated.

SUMMARY

The plunger fuel pump is a pump having a structure that is advantageous for obtaining a high discharge pressure. However, a high pressure is applied to the plunger from fluid in the compression chamber during the discharge operation of the plunger fuel puny. Therefore, a strong magnetic force is required to move the plunger with the use of the electromagnet. Accordingly, electric power consumed by the electromagnet becomes large.

The disclosure provides a plunger electric fuel pump with low electric power consumption.

A first aspect of the disclosure relates to a plunger electric fuel pump including a cylinder; a plunger configured to reciprocate inside the cylinder; a pump body including a compression chamber that is defined by the cylinder and the plunger such that fuel in the compression chamber is pressurized by moving the plunger inside the cylinder; a movable element to which the plunger is connected; a fixed core provided so as to face the movable element; a rotational core including a permanent magnet configured to move the movable element in a direction toward the pump body by applying a magnetic force to the movable element; an electric motor configured to rotate the rotational core; and a spring configured to urge the movable element in a direction away from the pump body. The rotational core and the fixed core are provided with a switching portion configured to switch between a first state and a second state when a rotational phase of the rotational core is changed, the first state being a state where the magnetic three of the permanent magnet is not applied to the movable element, and the second state being a state where the magnetic force of the permanent magnet is applied to the movable element.

With the configuration, when the magnetic three of the permanent magnet is applied to the movable element, the movable element to which the plunger is connected moves in the direction toward the pump body. When the magnetic force of the permanent magnet is not applied to the movable element, the movable element to which the plunger is connected moves in the direction away from the pump body due to an urging force of the spring. Accordingly, by repeating the first state where the magnetic force of the permanent magnet is not applied to the movable element and the second state where the magnetic force of the permanent magnet is applied to the movable element, the plunger is caused to reciprocate. Thus, the fuel pump performs a discharge operation. In the above-described configuration, the switching portion is provided, the switching portion being configured to switch between the first state and the second state when the rotational phase of the rotational core is changed.

Thus, the magnetic force the moving the plunger is generated from the permanent magnet that does not require electric power. When the fuel pump performs the discharge operation, only electric power consumed by the electric motor to rotate the rotational core is required. The electric power consumed by the electric motor to rotate the rotational core is smaller than electric power consumed by an electromagnet in a case where a plunger receiving a high pressure is connected to a movable element and the movable element is drawn by a magnetic force of the electromagnet. Thus, with the above-described configuration, it is possible to provide the plunger electric fuel pump with low electric power consumption.

In the plunger electric fuel pump, the fixed core may include an inner core, and an outer core disposed so as to be distanced from an outer peripheral surface of the inner core; the switching portion may include a first protruding portion provided in the inner core, a second protruding portion provided in the outer core, a third protruding portion provided in the rotational core and projecting so as to face the first protruding portion of the inner core, and a fourth protruding portion provided in the rotational core and projecting so as to face the second protruding portion of the outer core; protruding amounts of the first protruding portion and the third protruding portion may be set such that when the first protruding portion provided in the inner core faces the third protruding portion provided in the rotational core due to a change of the rotational phase of the rotational core, a gap between the first protruding portion and the third protruding portion is narrower than a gap between the rotational core and the outer core; and protruding amounts of the second protruding portion and the fourth protruding portion may be set such that when the second protruding portion provided in the outer core faces the fourth protruding portion provided in the rotational core due to the change of the rotational phase of the rotational core, a gap between the second protruding portion and the fourth protruding portion is narrower than a gap between the rotational core and the inner core.

With the configuration, the protruding amounts of the first protruding portion and the third protruding portion are set such that when the first protruding portion provided in the inner core faces the third protruding portion provided in the rotational core, the gap between the first protruding portion and the third protruding portion is narrower than the gap between the rotational core and the outer core. Accordingly, when the first protruding portion faces the third protruding portion, a magnetic resistance in the gap between the first protruding portion and the third protruding portion is smaller than a magnetic resistance in the gap between the rotational core and the outer core, and thus, a magnetic flux of the permanent magnet passes through the gap between the first protruding portion and the third protruding portion. Further, in this case, an annular closed magnetic circuit is constituted by a part of the inner core close to the rotational core and the rotational core including the permanent magnet, and thus, the magnetic force of the permanent magnet is not applied to the movable element. Accordingly, the first state is caused.

The protruding amounts of the second protruding portion and the fourth protruding portion are set such that when the second protruding portion provided in the outer core faces the fourth protruding portion provided in the rotational core, the gap between the second protruding portion and the fourth protruding portion is narrower than the gap between the rotational core and the inner core. Accordingly, when the second protruding portion faces the fourth protruding portion, a magnetic resistance in the gap between the second protruding portion and the fourth protruding portion is smaller than a magnetic resistance in the gap between the rotational core and the inner core, and thus, a magnetic flux of the permanent magnet passes through the gap between the second protruding portion and the fourth protruding portion. In this case, an annular closed magnetic circuit is constituted by the rotational core including the permanent magnet, the outer core, the movable element, and the inner core, and thus, the magnetic force of the permanent magnet is applied to the movable element. Accordingly, the second state is caused.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

A plunger electric fuel pump (hereinafter referred to as the fuel pump) according to an embodiment of the disclosure will be described below with reference to FIGS. 1 to 19. Note that, in the following description, an arrow UP indicates an upper side of a fuel pump, and an arrow DW indicates a lower side of the fuel pump in each of the drawings. Further, an alternate long and short dash line C illustrated in each of the drawings indicates a central axis of a first plunger 224 and a second plunger 324 (described later), and hereinafter, this line C is referred to as a central axis C.

Figure 1:
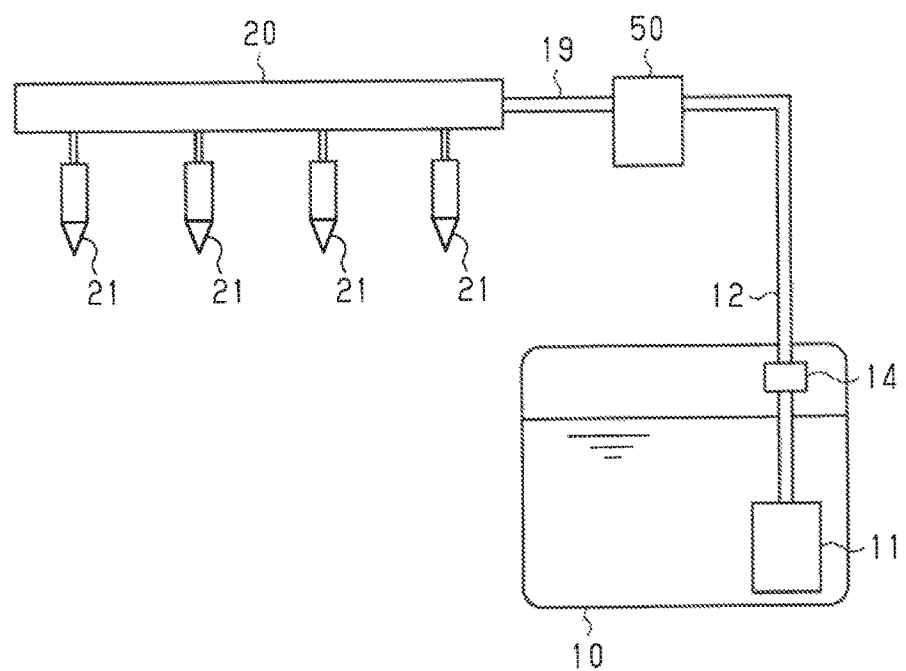
FIG. 1 is a view schematically illustrating a configuration of a fuel system for an engine provided with a plunger electric fuel pump according to an embodiment.

A fuel pump 50 according to the present embodiment is configured as a high-pressure fuel pump provided for a direct injection engine provided in a vehicle. As illustrated in FIG. 1, a feed pump 11 configured to pump out fuel is provided inside a fuel tank 10 for the direct injection engine. The feed pump 11 is connected to the fuel pump 50 via a low-pressure fuel passage 12. In the low-pressure fuel passage 12, a regulator 14 is provided. The regulator 14 discharges fuel in the low-pressure fuel passage 12 to the fuel tank 10 when a fuel pressure inside the low-pressure fuel passage 12 exceeds a prescribed value.

The fuel pump 50 is provided in the vicinity of the direct injection engine, for example, and is connected to a delivery pipe 20 via a high-pressure fuel passage 19. An injector 21 provided in each cylinder of the direct injection engine is connected to the delivery pipe 20.

Figure 2:
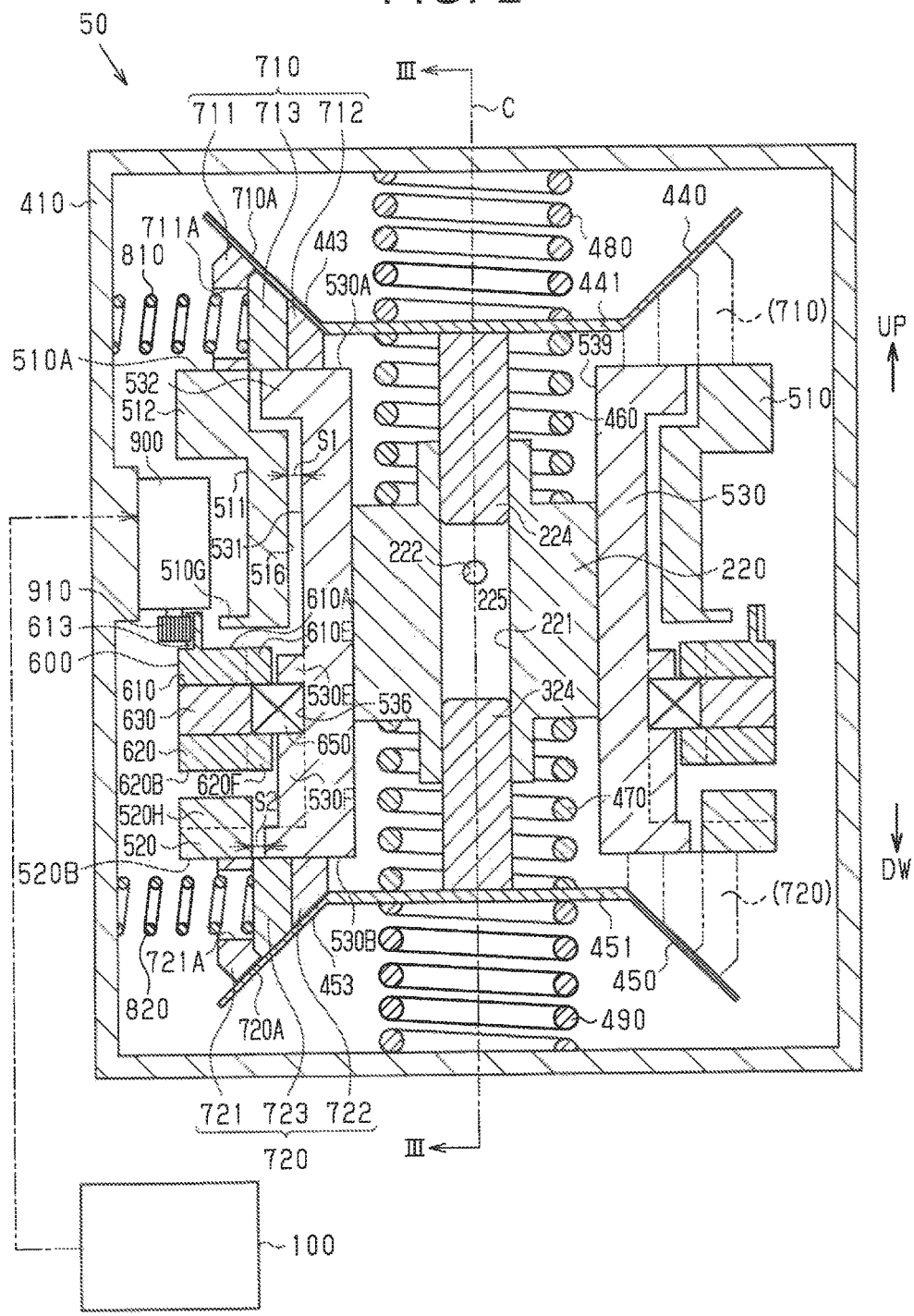
FIG. 2 is a sectional view of the electric fuel pump according to the embodiment.

As illustrated in FIG. 2, the fuel pump 50 includes a tubular housing 410. A cylindrical pump body 220 is provided in the housing 410. A cylindrical cylinder 221 is provided in the pump body 220 so as to extend through the pump body 220 in an up-down direction. A round-bar-shaped first plunger 224 that reciprocates and a round-bar-shaped second plunger 324 that reciprocates are inserted into the cylinder 221 such that the first plunger 224 and the second plunger 324 face each other.

The first plunger 224 and the second plunger 324 are disposed such that one end of each of the first plunger 224 and the second plunger 324 is inserted into the cylinder 221, and the other end of the first plunger 224 and the second plunger 324 is projected outward of the cylinder 221. Thus, an inner part of the cylinder 221 is sectioned by the first plunger 224 and the second plunger 324, so as to form a compression chamber 225 that pressurizes fuel.

Figure 3:
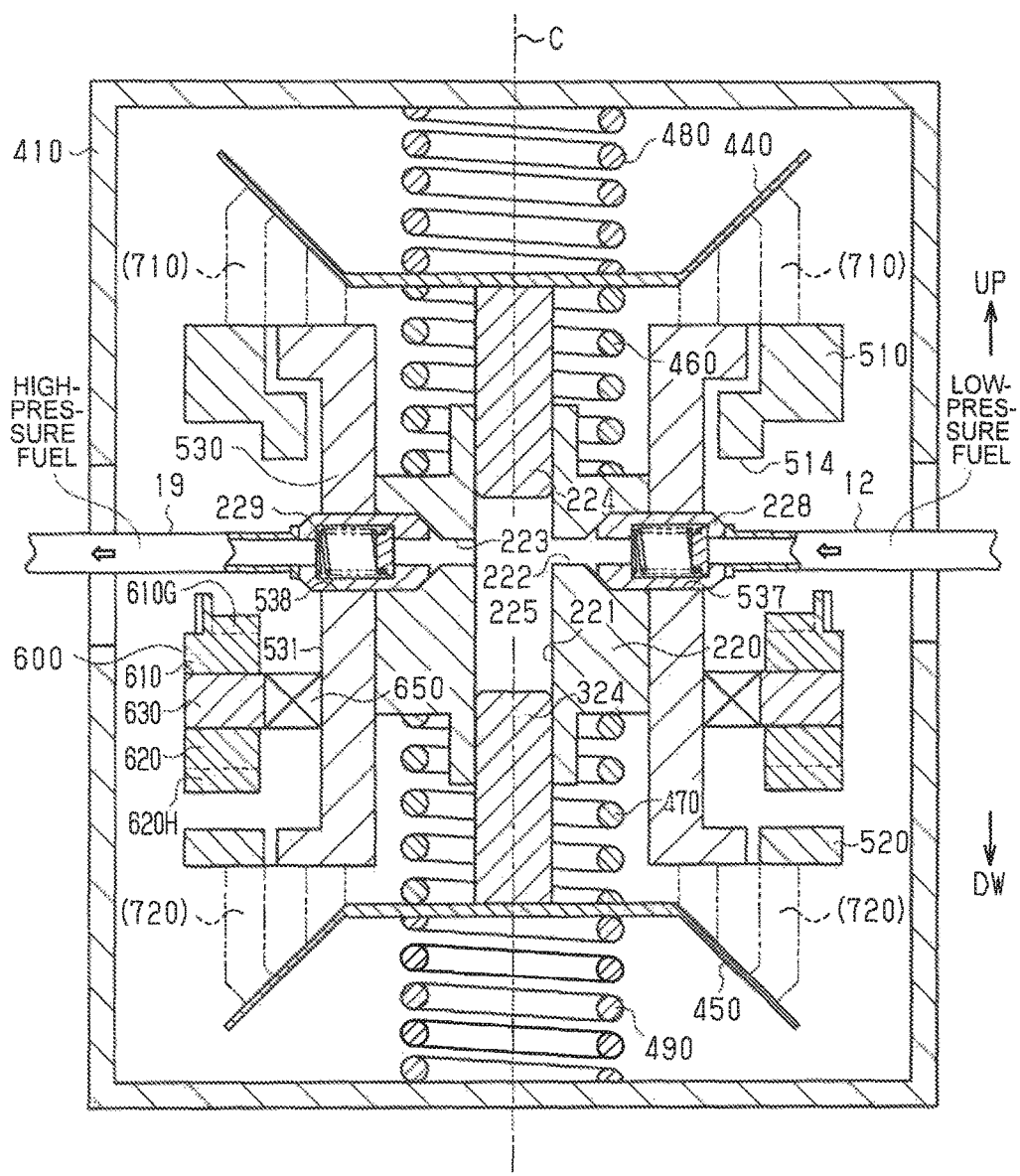
FIG. 3 is a sectional view of the electric fuel pump taken along a line III-III in FIG. 2.

As illustrated in FIG. 3, the pump body 220 is provided with an intake passage 222 configured to take, into the compression chamber 225, low-pressure fuel fed through the low-pressure fuel passage 12, and a discharge passage 223 configured to discharge high-pressure fuel pressurized in the compression chamber 225 to the high-pressure fuel passage 19.

The intake passage 222 is provided with a first check valve 228 configured to allow the low-pressure fuel fed through the low-pressure fuel passage 12 to flow into the compression chamber 225 and to stop a flow of the fuel from the compression chamber 225 to the low-pressure fuel passage 12.

The discharge passage 223 is provided with a second check valve 229 configured to allow the high-pressure fuel pressurized in the compression chamber 225 to flow into the high-pressure fuel passage 19 and to stop a flow of the fuel from the high-pressure fuel passage 19 to the compression chamber 225.

As illustrated in FIG. 2, a first movable element 440 having a substantially disc shape and made of a soft magnetic material (e.g., iron) is provided inside the housing 410. A disc-shaped first flat portion 441 expanding in parallel with a radial direction of the first movable element 440 is provided in a central part of the first movable element 440, and an end portion of the first plunger 224 projecting outward of the cylinder 221 is connected to a central part of the first flat portion 441.

An annular first inclined surface 443 inclined and expanding in a radial direction of the first plunger 22.4 is provided on an outer periphery of the first flat portion 441. Further, a second movable element 450 is provided inside the housing 410. The second movable element 450 is provided so as face the first movable element 440 in a direction where the central axis C of the first plunger 224 extends.

The second movable element 450 also has a substantially disc shape and is made of a soft magnetic material. A disc-shaped second flat portion 451 expanding in parallel with a radial direction of the second movable element 450 is provided in a central part of the second movable element 450, and an end portion of the second plunger 324 projecting outward of the cylinder 221 is connected to a central part of the second flat portion 451.

An annular second inclined surface 453 inclined and expanding in a radial direction of the second plunger 324 is provided on an outer periphery of the second flat portion 451. An inclination angle of the second inclined surface 453 is the same as an inclination angle of the first inclined surface 443.

The second movable element 450 is provided so as to function as a counterweight that restrains vibration to be generated along with reciprocation of the first movable element 440, and plate thicknesses, sizes, and the like of the first movable element 440 and the second movable element 4.50 are set so that a mass of the first movable element 440 and a mass of the second movable element 450 are substantially the same. A hole for mass adjustment may be provided in the first movable element 440 and the second movable element 450, or a weight may be attached thereto so that the mass of the first movable element 440 and the mass of the second movable element 450 become substantially the same.

A fixed core is provided inside the housing 410 so as to face the first inclined surface 443 of the first movable element 440 and the second inclined surface 453 of the second movable element 450. More particularly, the fixed core includes a cylindrical inner core 530 made of a soft magnetic material, a cylindrical first outer core 510 made of a soft magnetic material, and an annular second outer core 520 made of a soft magnetic material. The inner core 530, the first outer core 510, and the second outer core 520 are disposed such that their respective central axes coincide with the central axis C.

The pump body 220 is fixed inside the inner core 530. The first outer core 510 is disposed so as to surround an upper part of an outer peripheral surface of the inner core 530 in an annular manner. Further, a gap S1 is provided between an inner peripheral surface of the first outer core 510 and the outer peripheral surface of the inner core 530, and thus, the inner peripheral surface of the first outer core 510 is distanced from the outer peripheral surface of the inner core 530. A position of the first outer core 510 and a position of the inner core 530 in a direction where the central axis C extends are set such that an upper end surface 530A of the inner core 530 and an upper end surface 510A of the first outer core 510 are aligned on the same plane.

The second outer core 520 is disposed so as to surround a lower part of the outer peripheral surface of the inner core 530 in an annular manner. Further, a gap S2 is provided between an inner peripheral surface of the second outer core 520 and the outer peripheral surface of the inner core 530, and thus, the inner peripheral surface of the second outer core 520 is distanced from the outer peripheral surface of the inner core 530. A position of the second outer core 520 in the direction where the central axis C extends is set such that a lower end surface 530B of the inner core 530 and a lower end surface 520B of the second outer core 520 are aligned on the same plane. Note that the first outer core 510 and the second outer core 520 correspond to the outer core disposed so as to be distanced from the outer peripheral surface of the inner core.

An inclination direction of the first inclined surface 443 of the first movable element 440 is set such that the first inclined surface 443 is away from the upper end surface 530A of the inner core 530 and the upper end surface 510A of the first outer core 510 in a direction toward the outer periphery of the first inclined surface 443 (i.e., a distance between the first inclined surface 443 and the upper end surfaces 530A, 510A of the inner core 530 and the first outer core 510 increases in the direction toward the outer periphery of the first inclined surface 443). Similarly, an inclination direction of the second inclined surface 453 of the second movable element 450 is set such that the second inclined surface 453 is away from the lower end surface 530B of the inner core 530 and the lower end surface 520B of the second outer core 520 in a direction toward the outer periphery of the second inclined surface 453 (i.e., a distance between the second inclined surface 453 and the lower end surfaces 530B, 520B of the inner core 530 and the second outer core 520 increases in the direction toward the outer periphery of the second inclined surface 453).

Figure 4:
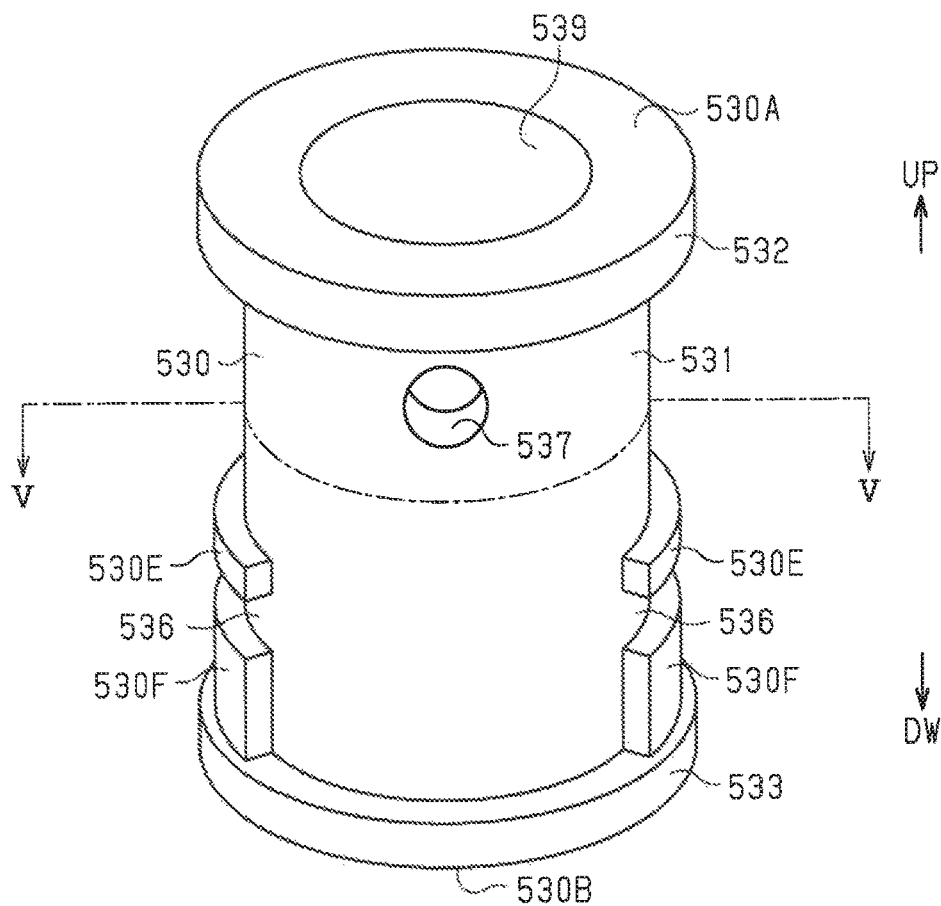
FIG. 4 is a perspective view of an inner core.

As illustrated in FIG. 4, the inner core 530 includes a tubular first cylindrical portion 531 having a through-hole 539 into which the pump body 220 is inserted to be fixed. The first cylindrical portion 531 has a hole 537 into which the first check valve 228 is inserted and a hole 538 into which the second check valve 229 (see FIG. 3).

Further, an upper part of the inner core 530 is provided with an annular first large-diameter portion 532 having an outside diameter larger than that of the first cylindrical portion 531, and a lower part of the inner core 530 is provided with an annular second large-diameter portion 533 having an outside diameter larger than that of the first cylindrical portion 531. Note that a top face of the first large-diameter portion 532 is the upper end surface 530A of the inner core 530. Further, a bottom face of the second large-diameter portion 533 is the lower end surface 530B of the inner core 530.

An outer peripheral surface of the first cylindrical portion 531 is provided with two first projection portions 530E projecting from the outer peripheral surface and extending in a circumferential direction. The two first projection portions 530E are provided at respective positions in phases different from each other by 180 degrees in the circumferential direction of the first cylindrical portion 531, in other words, at respective positions facing each other in a diameter direction of the first cylindrical portion 531.

Further, two second projection portions 530F projecting from the outer peripheral surface of the first cylindrical portion 531 and extending in the circumferential direction are provided below the first projection portions 530E, on the outer peripheral surface of the first cylindrical portion 531. The two second projection portions 530F are provided at respective positions in phases different from each other by 180 degrees in the circumferential direction of the first cylindrical portion 531, in other words, at respective positions facing each other in the diameter direction of the first cylindrical portion 531. Note that the first projection portion 530E and the second projection portion 530F may be regarded as the first protruding portion provided in the inner core.

The first projection portion 530E and the second projection portion 530F are arranged in parallel at a prescribed interval in an up-down direction of the first cylindrical portion 531. Since the first projection portion 530E and the second projection portion 530F face each other, a groove 536 is provided between the opposed surfaces of the first projection portion 530E and the second projection portion 530F so as to extend in the circumferential direction of the first cylindrical portion 531.

Figure 5:
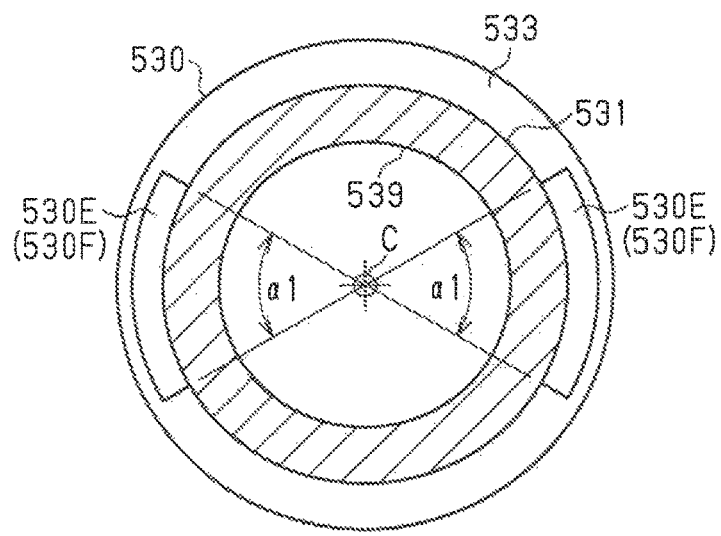
FIG. 5 is a sectional view of the inner core taken along a line V-V in FIG. 4.

As illustrated in FIG. 5 and FIG. 4, the first projection portion 530E and the second projection portion 530F, which are arranged in parallel at the prescribed interval in the up-down direction of the first cylindrical portion 531, are provided at positions in the same phase in the circumferential direction of the first cylindrical portion 531. Further, a central angle of a circular arc of the first projection portion 530E and a central angle of a circular arc of the second projection portion 530F are both set to the same central angle $\alpha 1$.

Figure 6:
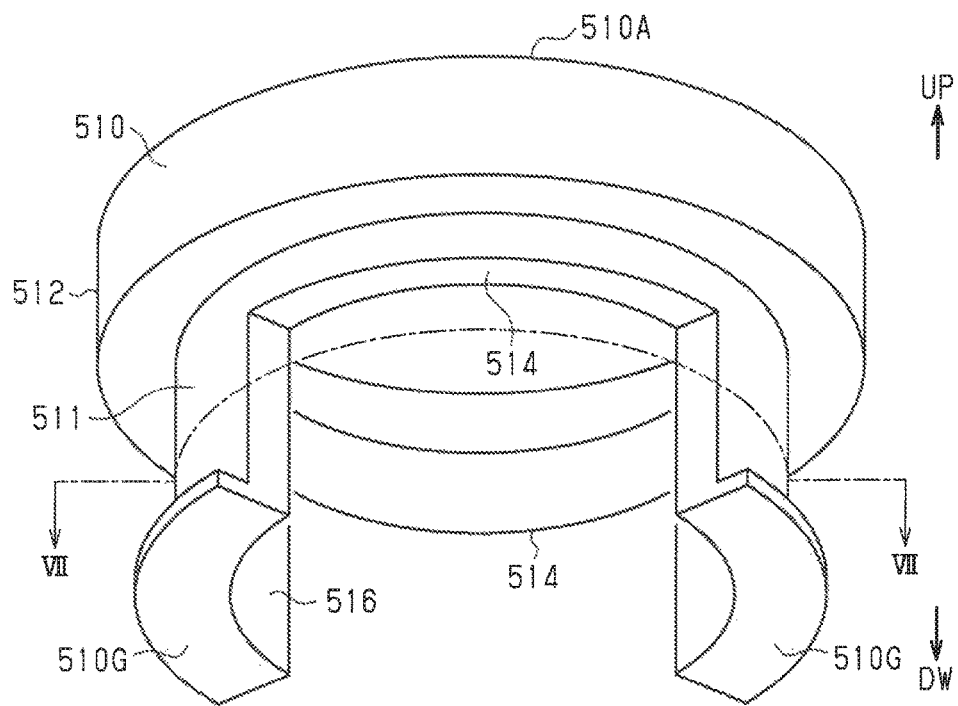
FIG. 6 is a perspective view of a first outer core.

As illustrated in FIG. 6, the first outer core 510 includes a tubular second cylindrical portion 511 having a hole 516 into which the first cylindrical portion 531 is inserted. A diameter of the hole 516 is provided to be larger than the outside diameter of the first cylindrical portion 531, and thus, the gap S1 is provided between the inner peripheral surface of the second cylindrical portion 511 and the outer peripheral surface of the first cylindrical portion 531.

Two cutout portions 514 opened toward a lower side of the second cylindrical portion 511 are provided in the second cylindrical portion 511. The two cutout portions 514 are provided at respective positions in phases different from each other by 180 degrees in a circumferential direction of the second cylindrical portion 511, in other words, at respective positions facing each other in a diameter direction of the second cylindrical portion 511.

An upper part of the first outer core 510 is provided with an annular third large-diameter portion 512 having an outside diameter larger than an outside diameter of the second cylindrical portion 511 and having an inside diameter larger that the outside diameter of the first large-diameter portion 532. Since the first large-diameter portion 532 is accommodated in the third large-diameter portion 512, the gap S1 is provided between an inner peripheral surface of the third large-diameter portion 512 and the outer peripheral surface of the first large-diameter portion 532. Note that a top face of the third large-diameter portion 512 is the upper end surface 510A of the first outer core 510.

Figure 7:
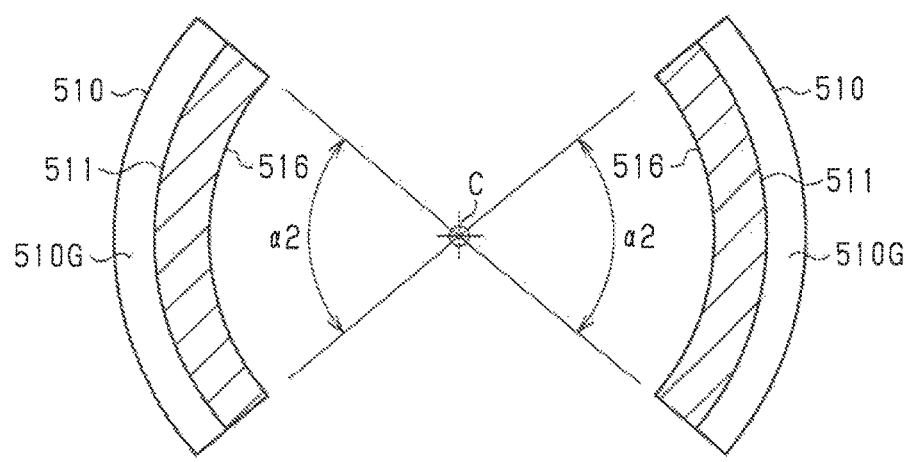
FIG. 7 is a sectional view of the first outer core taken along a line VII-VII in FIG. 6.

As illustrated in FIG. 7 and FIG. 6, two third projection portions 510G projecting from the outer peripheral surface of the second cylindrical portion 511 and extending in the circumferential direction are provided in a lower part of the first outer core 510. The two third projection portions 510G are provided at respective positions in phases different from each other by 180 degrees in the circumferential direction of the second cylindrical portion 511, in other words, at respective positions facing each other in the diameter direction of the second cylindrical portion 511. As illustrated in FIG. 7, respective central angles $\alpha 2$ of circular arcs of the third projection portions 510G facing each other are set to the same angle. Note that, in the present embodiment, the central angle $\alpha 2$ is set to an angle larger than the central angle $\alpha 1$, but the central angle $\alpha 2$ may be set to an angle smaller than the central angle $\alpha 1$. Further, the central angle $\alpha 2$ and the central angle $\alpha 1$ may be set to the same angle.

Figure 8:
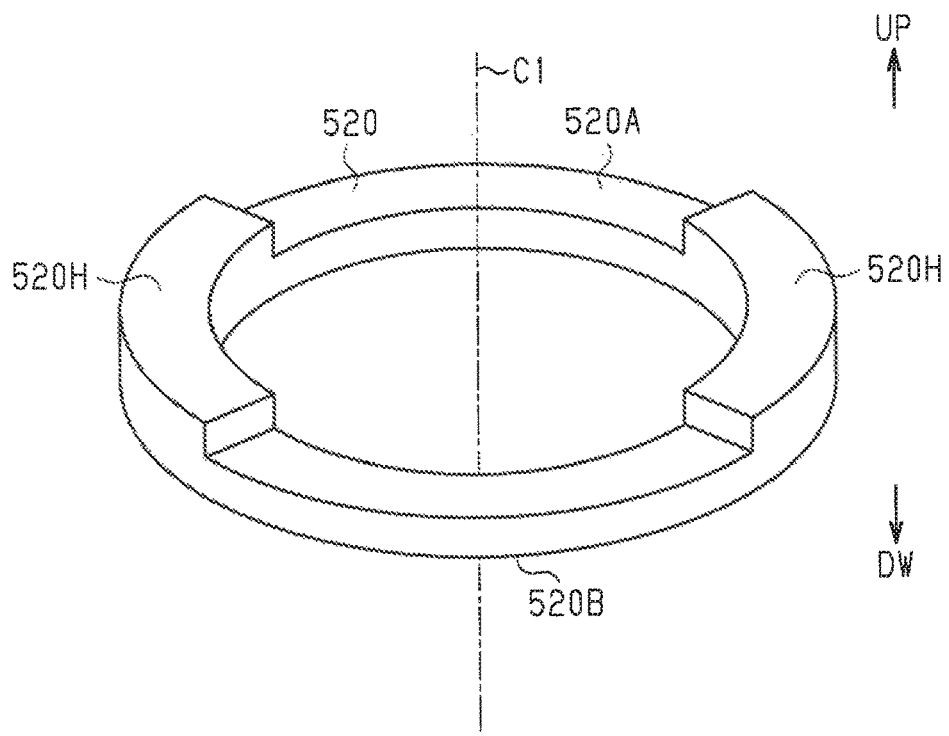
FIG. 8 is a perspective view of a second outer core.

As illustrated in FIG. 8, the second outer core 520 has an annular shape and its inside diameter is provided to be larger than the outside diameter of the second large-diameter portion 533. Thus, the gap S2 is provided between the inner peripheral surface of the second outer core 520 and the outer peripheral surface of the second large-diameter portion 533.

Figure 9:
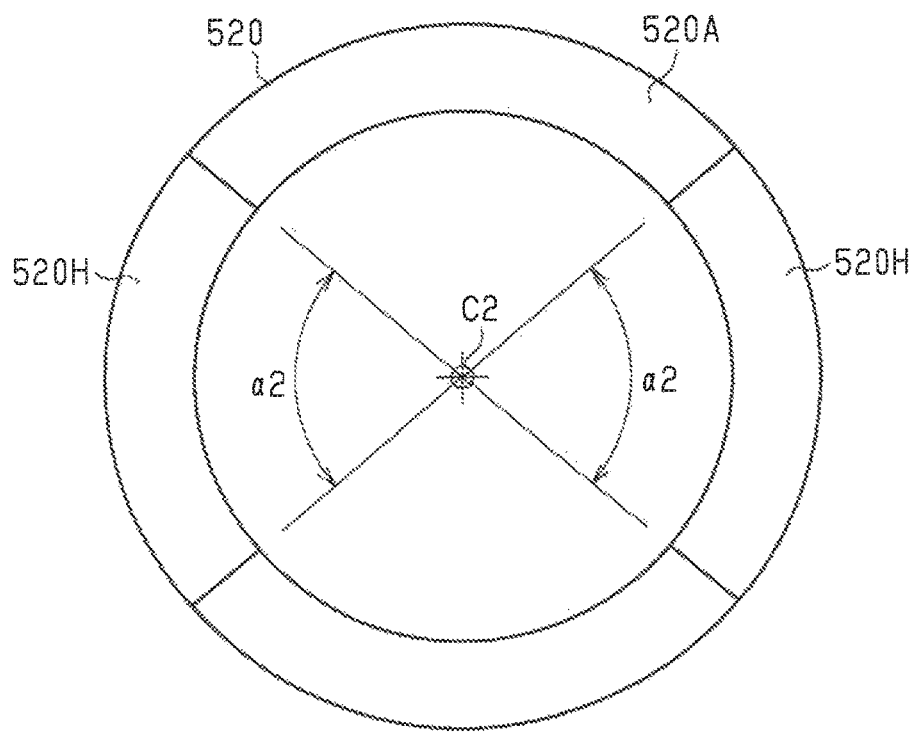
FIG. 9 is a plan view of the second outer core.

A top face 520A of the second outer core 520 is a side face of the second outer core 520, which is orthogonal to the central axis C1, and the top face 520A faces an upper side of the fuel pump 50. The top face 520A is provided with two fourth projection portions 520H projecting upward from the top face 520A and extending in a circumferential direction of the top face 520A. The two fourth projection portions 520H are provided at respective positions in phases different from each other by 180 degrees in a circumferential direction of the second outer core 520, in other words, at respective positions facing each other in a diameter direction of the second outer core 520. As illustrated in FIG. 9, respective central angles of circular arcs of the fourth projection portions 520H facing each other are set to the same angle as the central angle $\alpha 2$. Although the central angles of the circular arcs of the fourth projection portions 520H are set to the same angle as the central angle $\alpha 2$, as an example, in the present embodiment, the central angles of the circular arcs of the fourth projection portions 520H may be set to other angles. Note that the third projection portion 510G and the fourth projection portion 520H may be regarded as the second protruding portion provided in the outer core.

Figure 10:
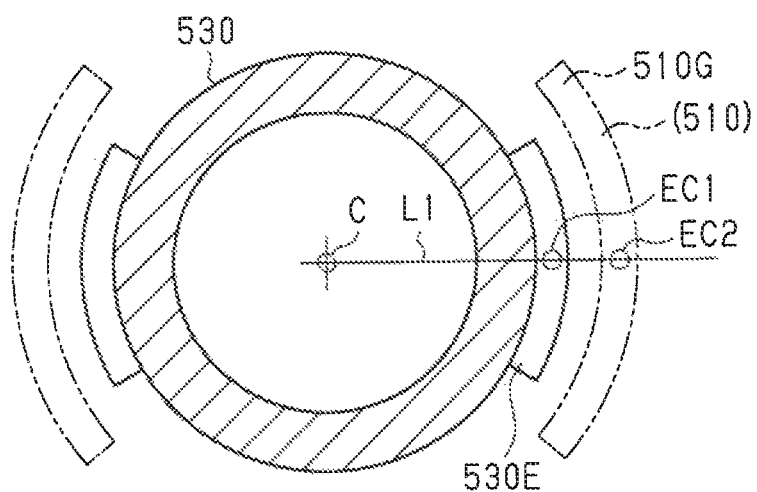
FIG. 10 is a schematic view illustrating a positional relationship between a projection portion of the inner core and a projection portion of the first outer core.

As illustrated in FIG. 10, the first outer core 510 is assembled in an assembling phase in a circumferential direction of the inner core 530 such that the first projection portion 530E of the inner core 530 and the third projection portion 510G of the first outer core 510 are located in the same phase in the circumferential direction of the inner core 530. That is, as illustrated in FIG. 10, the inner core 530 and the first outer core 510 are assembled inside the housing 410 such that a straight line L1 that passes through a center point EC1, in the circumferential direction, of the first projection portion 530E having a fan shape and a center point EC2, in the circumferential direction, of the third projection portion 510G having a fan shape intersects with the central axis C, when the inner core 530 is seen from a surface orthogonal to the central axis C.

Figure 11:
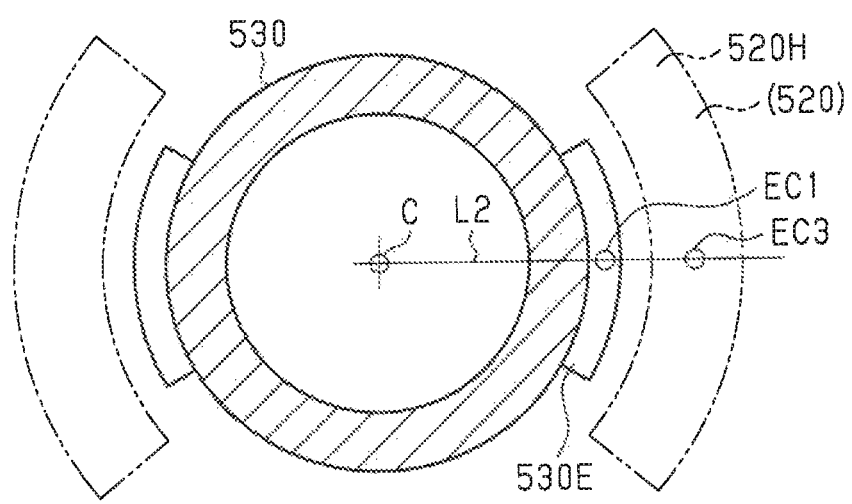
FIG. 11 is a schematic view illustrating a positional relationship between the projection portion of the inner core and a projection portion of the second outer core.

As illustrated in FIG. 11, the second outer core 520 is assembled in an assembling phase in the circumferential direction of the inner core 530 such that the first projection portion 530E of the inner core 530 and the fourth projection portion 520H of the second outer core 520 are located in the same phase in the circumferential direction of the inner core 530. That is, as illustrated in FIG. 11, the second outer core 520 is assembled inside the housing 410 such that a straight line L2 that passes through the center point EC1, in the circumferential direction, of the first projection portion 530E having a fan shape and a center point EC3, in the circumferential direction, of the fourth projection portion 520H having a fan shape intersects with the central axis C, when the inner core 530 is seen from the surface orthogonal to the central axis C.

As described above, the first projection portion 530E and the second projection portion 530F are provided at the positions in the same phase in the circumferential direction of the first cylindrical portion 531. Accordingly, when the inner core 530 is seen from a surface orthogonal to the central axis C, the first projection portion 530E, the second projection portion 530F, the third projection portion 510G, and the fourth projection portion 520H are disposed in the same phase in the circumferential direction of the inner core 530.

As illustrated in FIG. 2, an annular rotational core 600 rotating around the inner core 530 is provided between the first outer core 510 and the second outer core 520. A central axis C2 of the rotational core 600 coincides with the central axis C.

Figure 12:
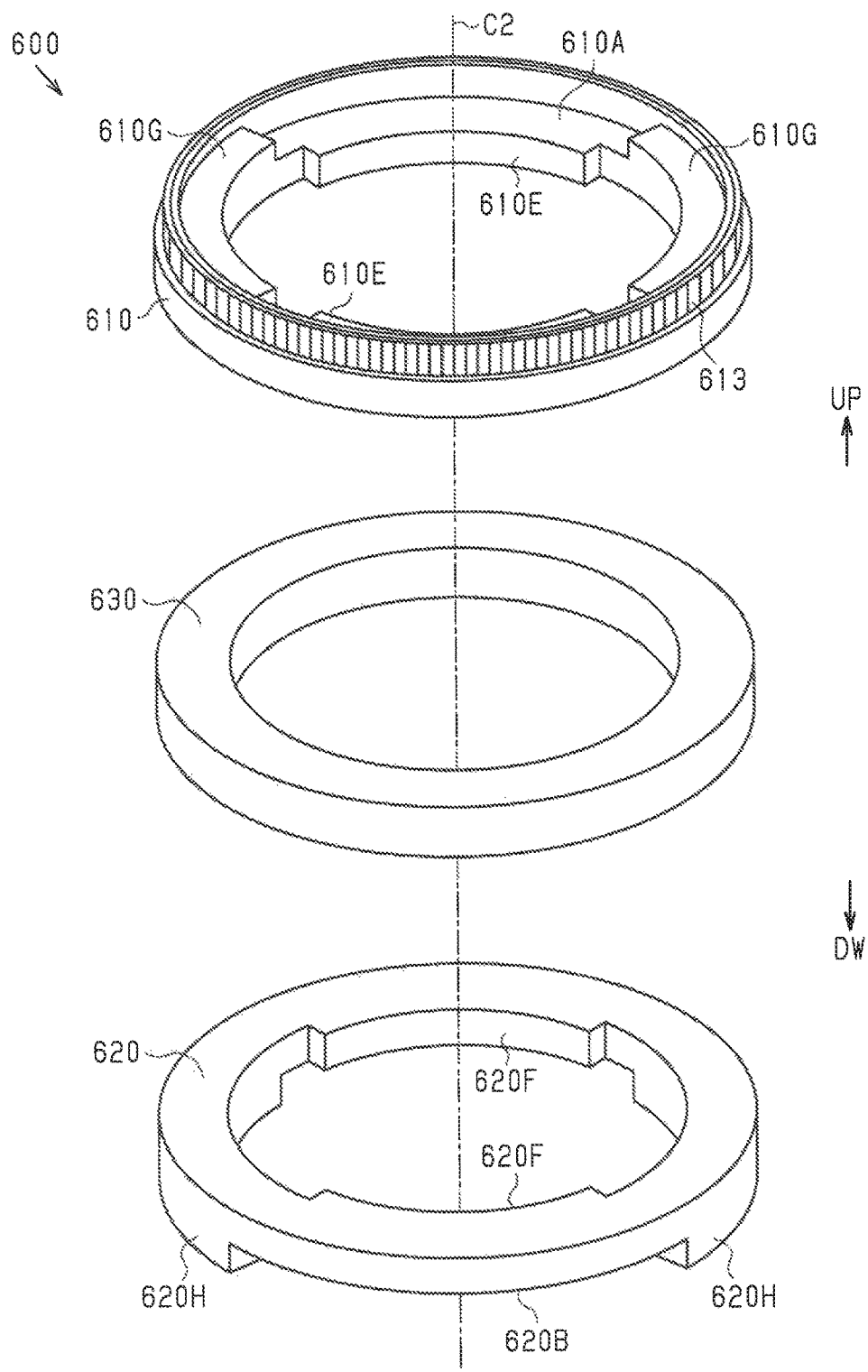
FIG. 12 is an exploded perspective view of a rotational core.

As illustrated in FIG. 12 and FIG. 2, the rotational core 600 includes an annular first ring 610 made of a soft magnetic material, an annular second ring 620 made of a soft magnetic material, and an annular permanent magnet 630 fixed to the first ring 610 and the second ring 620 in a state where the annular permanent magnet 630 is sandwiched between the first ring 610 and the second ring 620.

As illustrated in FIG. 12, a ring gear 613 having annular external teeth is provided on a top face 610A. The top face 610A is a side face of the first ring 610, which is orthogonal to the central axis C2, and the top face 610A faces the upper side of the fuel pump 50.

An inner peripheral surface of the first ring 610 is provided with two fifth projection portions 610E projecting in the radial direction of the first ring 610 from the inner peripheral surface and extending in the circumferential direction of the first ring 610. The two fifth projection portions 610E are provided at respective positions in phases different from each other by 180 degrees in a circumferential direction of the first ring 610, in other words, at respective positions facing each other in a diameter direction of the first ring 610.

Further, the top face 610A of the first ring 610 is provided with two sixth projection portions 610G projecting upward (in other words, projecting in a direction in which the central axis C2 of the rotational core 600 extends) from the top face 610A and extending in a circumferential direction of the top face 610A. The two sixth projection portions 610G are provided at respective positions in phases different from each other by 180 degrees in a circumferential direction of the first ring 610, in other words, at respective positions facing each other in the diameter direction of the first ring 610.

Figure 13:
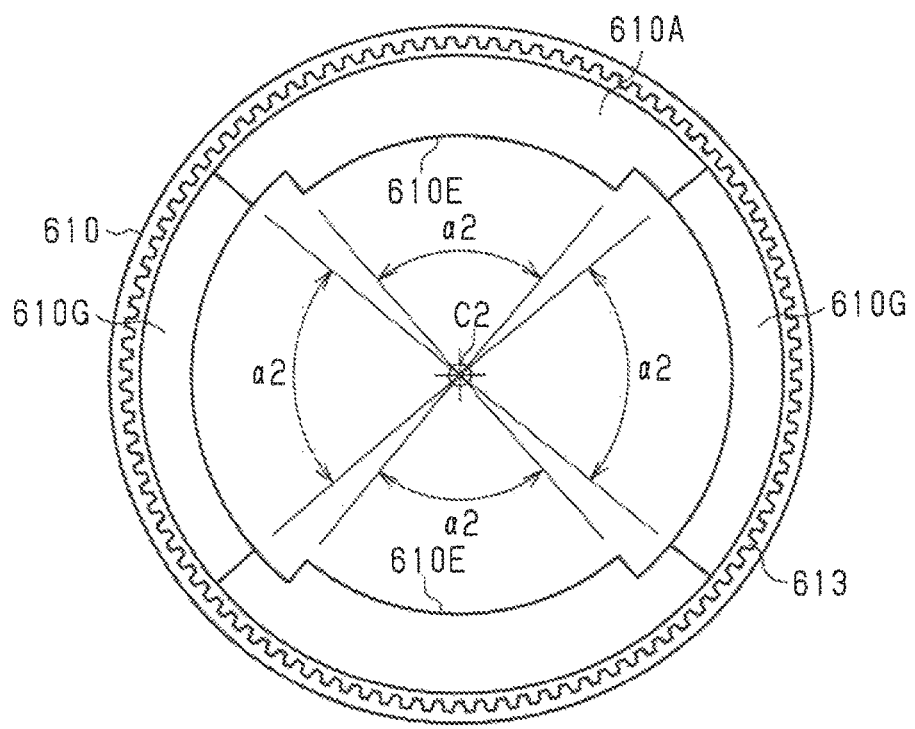
FIG. 13 is a plan view of a first ring.

As illustrated in. FIG. 13, respective central angles of circular arcs of the fifth projection portions 610E facing each other are set to the same angle as the central angle α2. Further, respective central angles of circular arcs of the sixth projection portions 610G facing each other are set to the same angle as the central angle α2. The fifth projection portion 610E and the sixth projection portion 610G are provided at respective positions in phases different from each other by 90 degrees in the circumferential direction of the first ring 610. Although the central angles of the circular arcs of the fifth projection portions 610E and the central angles of the circular arcs of the sixth projection portions 610G are set to the same angle as the central angle α2 as an example, in the present embodiment, the central angles of the circular arcs of the fifth projection portions 610E and the central angles of the circular arcs of the sixth projection portions 610G may be set to other angles.

As illustrated in FIG. 12, an inner peripheral surface of the second ring 620 is provided with two seventh projection portions 620F projecting in the radial direction of the second ring 620 from the inner peripheral surface and extending in the circumferential direction of the second ring 620. The two seventh projection portions 620F are provided at respective positions in phases different from each other by 180 degrees in the circumferential direction of the second ring 620, in other words, at respective positions facing each other in a diameter direction of the second ring 620.

A bottom face 620B is a side face of the second ring 620, which is orthogonal to the central axis C2, and the bottom face 620B faces a lower side of the fuel pump 50. The bottom face 620B is provided with two eighth projection portions 620H projecting downward (in other words, projecting in the direction in which the central axis C2 of the rotational core 600 extends) from the bottom face 620B and extending in a circumferential direction of the bottom face 620B. The two eighth projection portions 620H are provided at respective positions in phases different from each other by 180 degrees in the circumferential direction of the second ring 620, in other words, at respective positions facing each other in the diameter direction of the second ring 620.

Figure 14:
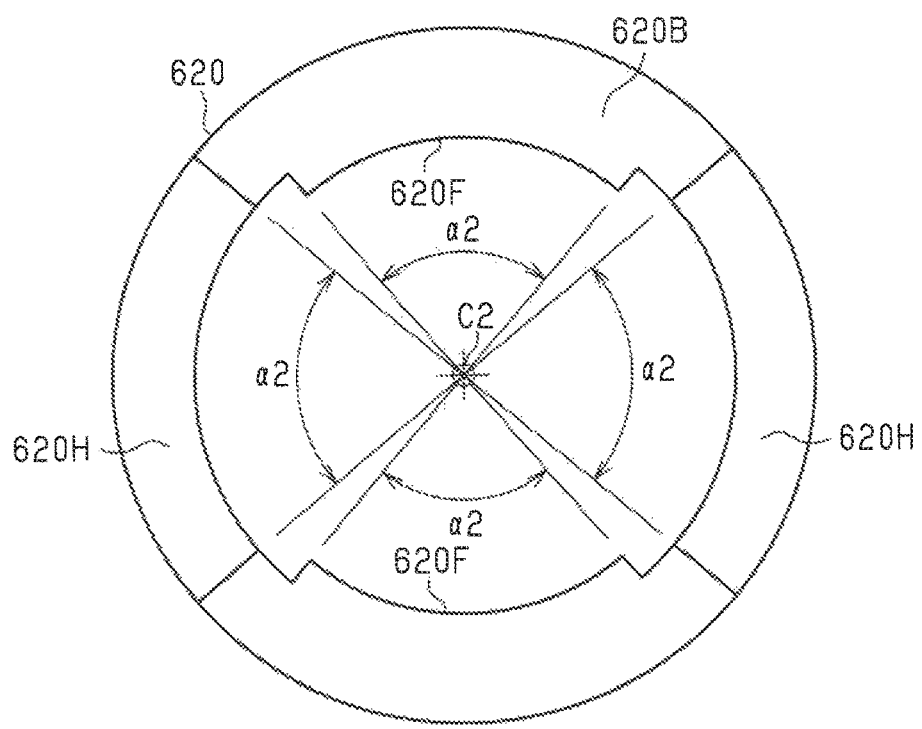
FIG. 14 is a plan view of a second ring.

As illustrated in FIG. 14, respective central angles of circular arcs of the seventh projection portions 620F facing each other are set to the same angle as the central angle α2. Further, respective central angles of circular arcs of the eighth projection portions 620H facing each other are also set to the same angle as the central angle α2. The seventh projection portion 620F and the eighth projection portion 620H are provided at respective positions in phases different from each other by 90 degrees in the circumferential direction of the second ring 620. Although the central angles of the circular arcs of the seventh projection portions 620F and the central angles of the circular arcs of the eighth projection portions 620H are set to the same angle as the central angle α2, as an example, in the present embodiment, the central angles of the circular arcs of the seventh projection portions 620F and the central angles of the circular arcs of the eighth projection portions 620H may be set to other angles.

As illustrated in FIG. 12, the first ring 610, the permanent magnet 630, and the second ring 620 are assembled such that the positions of the fifth projection portion 610E and the seventh projection portion 620F are located in the same phase in a circumferential direction of the rotational core 600. By assembling the first ring 610, the permanent magnet 630, and the second ring 620 as described above, the positions of the sixth projection portion 610G and the eighth projection portion 620H are located in the same phase in the circumferential direction of the rotational core 600.

Note that the fifth projection portion 610E and the seventh projection portion 620F may be regarded as the third protruding portion provided in the rotational core and projecting so as to face the first protruding portion of the inner core. Further, the sixth projection portion 610G and the eighth projection portion 620H may be regarded as the fourth protruding portion provided in the rotational core and projecting so as to face the second protruding portion of the outer core.

As illustrated in FIG. 2, a bearing 650 is provided between the inner peripheral surface of the permanent magnet 630 and the groove 536 of the inner core 530. The bearing 650 supports the rotational core 600 such that the rotational core 600 is rotatable. The bearing 650 is made of a material through which a magnetic flux of the permanent magnet 630 can hardly pass, that is, a material (e,g., ceramic) having a large magnetic resistance.

The rotational core 600 is assembled such that the fifth projection portion 610E of the first ring 610 faces the first projection portion 530E of the inner core 530, the seventh projection portion 620F of the second ring 620 faces the second projection portion 530F of the inner core 530, the top face 610A of the first ring 610 faces the third projection portion 510G of the first outer core 510, and the bottom face 620B of the second ring 620 faces the fourth projection portion 520H of the second outer core 520.

Figure 15:
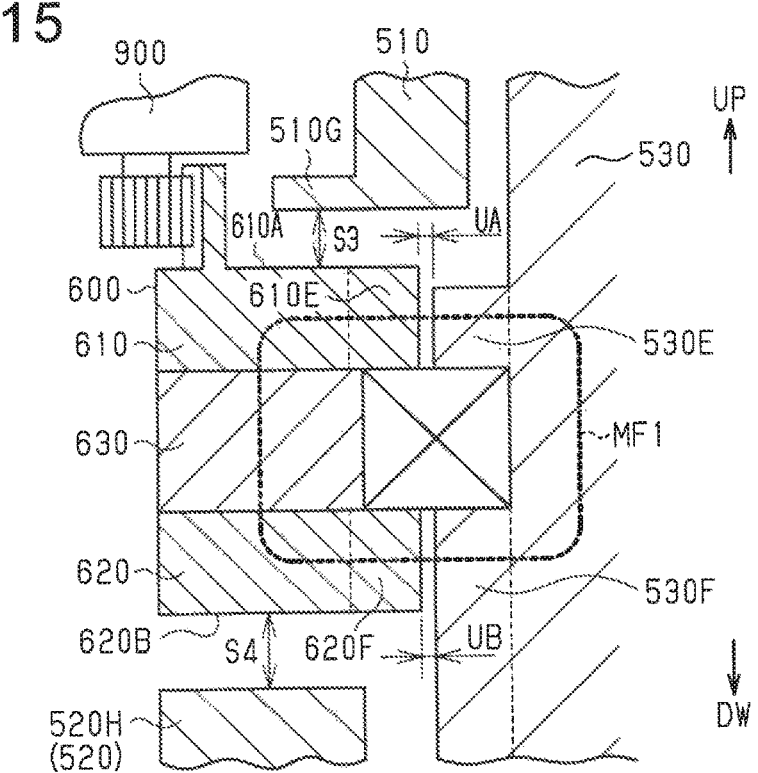
FIG. 15 is an enlarged sectional view illustrating the rotational core and members near the rotational core.

As illustrated in FIG. 15, respective protruding amounts of the first projection portion 530E and the fifth projection portion 610E are set such that when the fifth projection portion 610E of the first ring 610 faces the first projection portion 530E of the inner core 530 and the seventh projection portion 620F of the second ring 620 faces the second projection portion 530F of the inner core 530 due to a change of a rotational phase of the rotational core 600 caused by the rotation of the rotational core 600, a first gap UA having a prescribed distance is provided between the first projection portion 530E and the fifth projection portion 610E.

Note that, in the following description, a state where the fifth projection portion 610E faces the first projection portion 530E and the seventh projection portion 620F faces the second projection portion 530F is referred to as a first state. The distance of the first gap UA is set to be narrower than a gap S3 provided between the top face 610A of the first ring 610 and the third projection portion 510G of the first outer core 510 in the first state. That is, the distance of the first gap UA is set to be narrower than a gap provided between the rotational core 600 and the first outer core 510 in the first state.

Similarly, respective protruding amounts of the second projection portion 530F and the seventh projection portion 620F are set such that a prescribed second gap UB is provided between the second projection portion 530F and the seventh projection portion 620F in the first state. The distance of the second gap 1B is set to be narrower than a gap S4 provided between the bottom face 620B of the second ring 620 and the fourth projection portion 520H of the second outer core 520 in the first state. That is, the distance of the second gap UB is set to be narrower than a gap provided between the rotational core 600 and the second outer core 520 in the first state.

Figure 16:
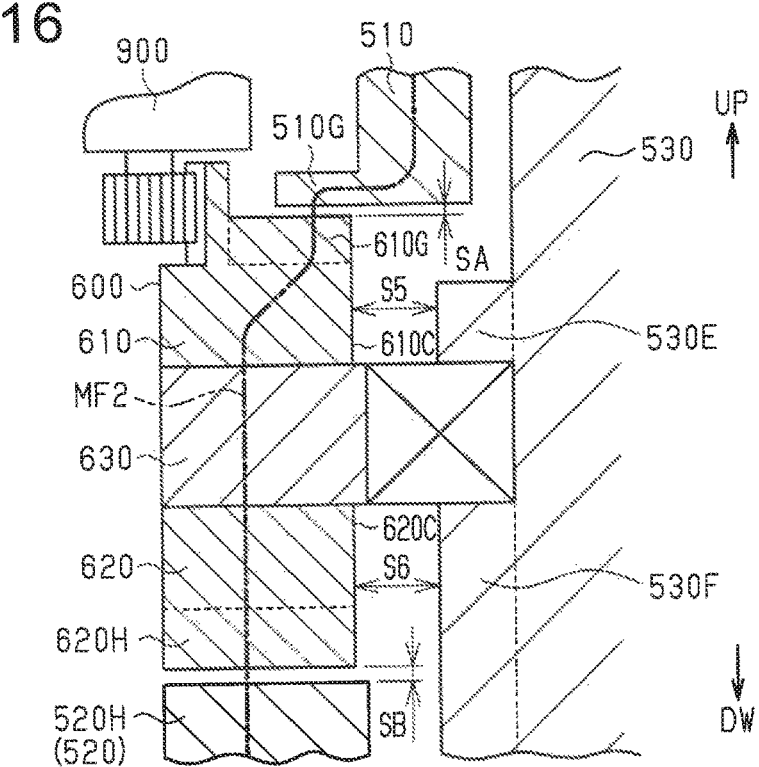
FIG. 16 is an enlarged sectional view illustrating the rotational core and the members near the rotational core.

As illustrated in FIG. 16, respective protruding amounts of the third projection portion 510G and the sixth projection portion 610G are set such that when the sixth projection portion 610G of the first ring 610 faces the third projection portion 510G of the first outer core 510 and the eighth projection portion 620H of the second ring 620 faces the fourth projection portion 520H of the second outer core 520 due to a change of the rotational phase of the rotational core 600 caused by the further rotation of the rotational core 600 from the first state, a third gap SA having a prescribed distance is provided between the third projection portion 510G and the sixth projection portion 610G.

Note that, in the following description, a state where the sixth projection portion 610G faces the third projection portion 510G and the eighth projection portion 620H faces the fourth projection portion 520H is referred to as a second state. The distance of the third gap SA is set to be narrower than a gap S5 provided between the inner peripheral surface 610C of the first ring 610 and the first projection portion 530E of the inner core 530 in the second state. That is, the distance of the third gap SA is set to be narrower than a gap provided between the rotational core 600 and the inner core 530 in the second state.

Similarly, respective protruding amounts of the fourth projection portion 520H and the eighth projection portion 620H are set such that a prescribed fourth gap SB is provided between the fourth projection portion 520H and the eighth projection portion 620H in the second state. The distance of the fourth gap SB is set to be narrower than a gap S6 provided between the inner peripheral surface 620C of the second ring 620 and the second projection portion 530F of the inner core 530 in the second state. That is, the distance of the fourth gap SB is set to be narrower than a gap provided between the rotational core 600 and the inner core 530 in the second state.

As illustrated in FIG. 2, an electric motor 900 is fixed inside the housing 410, and a pinion gear 910 meshing with the ring gear 613 is provided on an output shaft of the electric motor 900. The rotational core 600 is rotationally driven by the electric motor 900.

A first spring 460 configured to urge the first movable element 440 in a direction away from the pump body 220 is disposed between the first flat portion 441 of the first movable element 440 and the pump body 220 facing the first flat portion 441.

A second spring 470 configured to urge the second movable element 450 in a direction away from the pump body 220 is disposed between the second flat portion 451 of the second movable element 450 and the pump body 220 facing the second flat portion 451.

A fifth spring 480 configured to urge the first movable element 440 in a direction toward the pump body 220 is disposed between the first flat portion 441 of the first movable element 440 and an inner wall of the housing 410, the inner wall facing the first flat portion 441.

A sixth spring 490 configured to urge the second movable element 450 in a direction toward the pump body 220 is disposed between the second flat portion 451 of the second movable element 450 and an inner wall of the housing 410, the inner wall facing the second flat portion 451.

The fifth spring 480 and the sixth spring 490 have the same free length, the same spring constant, and the same pre-compression amount. Further, the first spring 460 and the second spring 470 have the same free length, the same spring constant, and the same pre-compression amount. The spring constant of the fifth spring 480 and the sixth spring 490 is sufficiently smaller than the spring constant of the first spring 460 and the second spring 470. This prevents occurrence of a situation where the movement of the first movable element 440 away from the pump body 220 by the first spring 460 is disturbed by an urging force of the fifth spring 480. Similarly, this prevents occurrence of a situation where the movement of the second movable element 450 away from the pump body 220 by the second spring 470 is disturbed by an urging force of the sixth spring 490.

First movable cores 710 are disposed between the first inclined surface 443 of the first movable element 440, and the upper end surface 530A of the inner core 530 and the upper end surface 510A of the first outer core 510, the upper end surfaces 530A, 510A facing the first inclined surface 443. The first movable cores 710 reciprocate in the radial direction of the first plunger 224 in a state where the first movable cores 710 are in contact with the upper end surface 530A of the inner core 530 and the upper end surface 510A of the first outer core 510.

Figure 17:
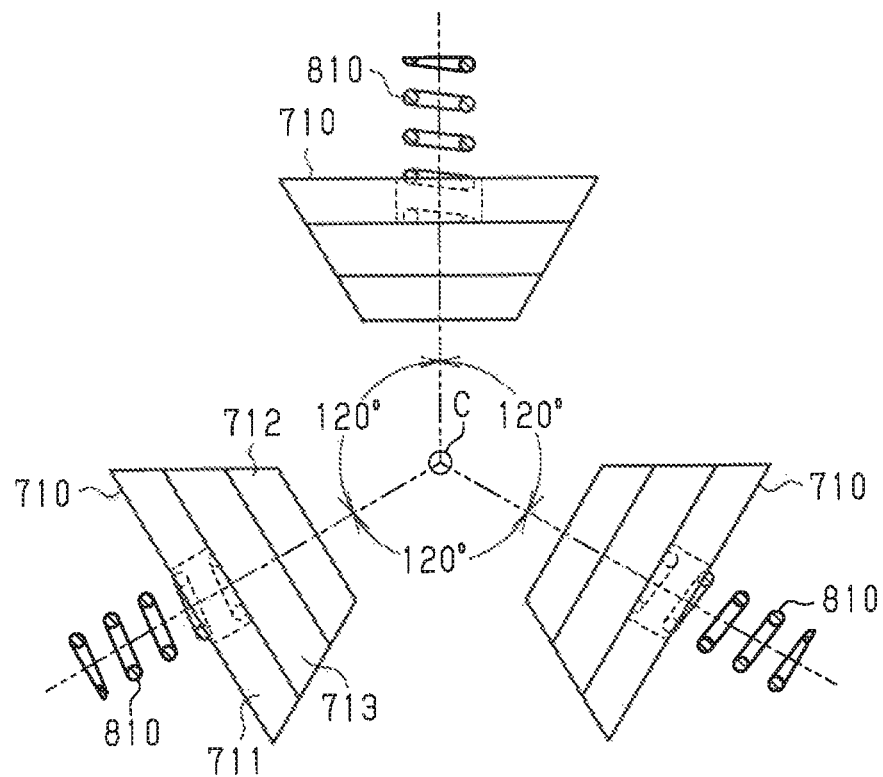
FIG. 17 is a plan view illustrating arrangement of first movable cores.

As illustrated in FIG. 17, three first movable cores 710 are disposed at equal angles around the central axis C of the first plunger 224. Note that the number of the first movable cores 710 that are disposed can be changed appropriately.

As illustrated in FIG. 2, each first movable core 710 is provided with a third inclined surface 710A set to have the same inclination angle as that of the first inclined surface 443 and making contact with the first inclined surface 443. Note that a first movable core 710 indicated by an alternate long and two short dashes line in FIG. 2 and FIG. 3 is a first movable core 710 that is not seen in a section in each of the drawings and is indicated by a virtual line.

Each first movable core 710 includes a first magnetic portion 711 that is constantly maintained in contact with the upper end surface 510A of the first outer core 510 at the time when the first movable core 710 reciprocates in the radial direction of the first plunger 224, and a second magnetic portion 712 that is constantly maintained in contact with the upper end surface 530A of the inner core 530 at the time when the first movable core 710 reciprocates in the radial direction of the first plunger 224. Each of the first magnetic portion 711 and the second magnetic portion 712 is made of a soft magnetic material. Further, a nonmagnetic portion 713 made of a nonmagnetic material such as aluminum alloy is provided between the first magnetic portion 711 and the second magnetic portion 712. By providing the nonmagnetic portion 713 between the first magnetic portion 711 and the second magnetic portion 712 as described above, the first magnetic portion 711 and the second magnetic portion 712 serve as a path for a magnetic flux in the first movable core 710.

A third spring 810 configured to urge the first movable core 710 to maintain a state where the first inclined surface 443 makes contact with the third inclined surface 710A is disposed between the first movable core 710 and an inner wall of the housing 410, the inner wall facing the first movable core 710. One end of the third spring 810 is inserted into a hole 711A provided at a part of the first magnetic portion 711, the part facing the inner wall of the housing 410. The other end of the third spring 810 contacts the inner wall of the housing 410. The first movable core 710 is urged by the third spring 810 in a direction toward the central axis C in the radial direction of the first plunger 224.

Second movable cores 720 are disposed between the second inclined surface 453 of the second movable element 450, and the lower end surface 530B of the inner core 530 and the lower end surface 520B of the second outer core 520, the lower end surfaces 530B, 520B of the inner core 530 and the second outer core 520 facing the second inclined surface 453. The second movable cores 720 are configured to reciprocate in a radial direction of the second plunger 324 in a state where the second movable cores 720 are in contact with the lower end surface 530B of the inner core 530 and the lower end surface 520B of the second outer core 520. The second movable core 720 has the same shape as that of the first movable core 710. Note that, similarly to the first movable cores 710, three second movable cores 720 are disposed at equal angles around the central axis C of the second plunger 324. Note that the number of the second movable cores 720 that are disposed can be also changed appropriately.

Each second movable core 720 is provided with a fourth inclined surface 720A set to have the same inclination angle as that of the second inclined surface 453 (that is, the same inclination angle as that of the first inclined surface 443) and making contact with the second inclined surface 453. Note that a second movable core 720 indicated by an alternate long and two short dashes line in FIG. 2 and FIG. 3 is a second movable core 720 that is not seen in the section in each of the drawings and is indicated by a virtual line.

Each second movable core 720 includes a first magnetic portion 721 that is constantly maintained in contact with the lower end surface 520B of the second outer core 520 at the time when the second movable core 720 reciprocates in the radial direction of the second plunger 324, and a second magnetic portion 722 that is constantly maintained in contact with the lower end surface 530B of the inner core 530 at the time when the second movable core 720 reciprocates in the radial direction of the second plunger 324. Each of the first magnetic portion 721 and the second magnetic portion 722 is made of a soft magnetic material. Further, a nonmagnetic portion 723 made of a nonmagnetic material such as aluminum alloy is provided between the first magnetic portion 721 and the second magnetic portion 722. By providing the nonmagnetic portion 723 between the first magnetic portion 721 and the second magnetic portion 722 as described above, the first magnetic portion 721 and the second magnetic portion 722 serve as a path for a magnetic flux in the second movable core 720.

A fourth spring 820 configured to urge the second movable core 720 to maintain a state where the second inclined surface 453 makes contact with the fourth inclined surface 720A is disposed between the second movable core 720 and an inner wall of the housing 410, the inner wall facing the second movable core 720. One end of the fourth spring 820 is inserted into a hole 721A provided at a part of the first magnetic portion 721 of the second movable core 720, the part facing the inner wall of the housing 410. The other end of the fourth spring 820 contacts the inner wall of the housing 410. The second movable core 720 is urged by the fourth spring 820 in a direction toward the central axis C in the radial direction of the second plunger 324.

A control device 100 configured to control a rotation speed of the electric motor 900 is connected to the electric motor 900. The control device 100 includes a central processing unit that executes various arithmetic processes; a read only memory that stores programs and data for control in advance; a random access memory that temporarily stores an operation result of the central processing unit, detection results of sensors, and the like; an input port; and an output port.

Next will be described an operation of the fuel pump 50 at the time of fuel suction. As illustrated in FIG. 15, in the first state, the first gap UA between the first projection portion 530E of the inner core 530 and the fifth projection portion 610E of the first ring 610 is narrower than the gap S3 between the top face 610A of the first ring 610 and the third projection portion 510E of the first outer core 510. Further, the second gap UB between the second projection portion 530F of the inner core 530 and the seventh projection portion 620F of the second ring 620 is narrower than the gap S4 between the bottom face 620B of the second ring 620 and the fourth projection portion 520H of the second outer core 520.

Accordingly, as indicated by a broken line in FIG. 15, a first magnetic flux MF1 indicating a flow of a magnetic flux generated from the permanent magnet 630 of the rotational core 600 in the first state passes through the first gap UA having a shorter distance and a smaller magnetic resistance than those of the gap S3 and the second gap UB having a shorter distance and a smaller magnetic resistance than those of the gap S4.

Figure 18:
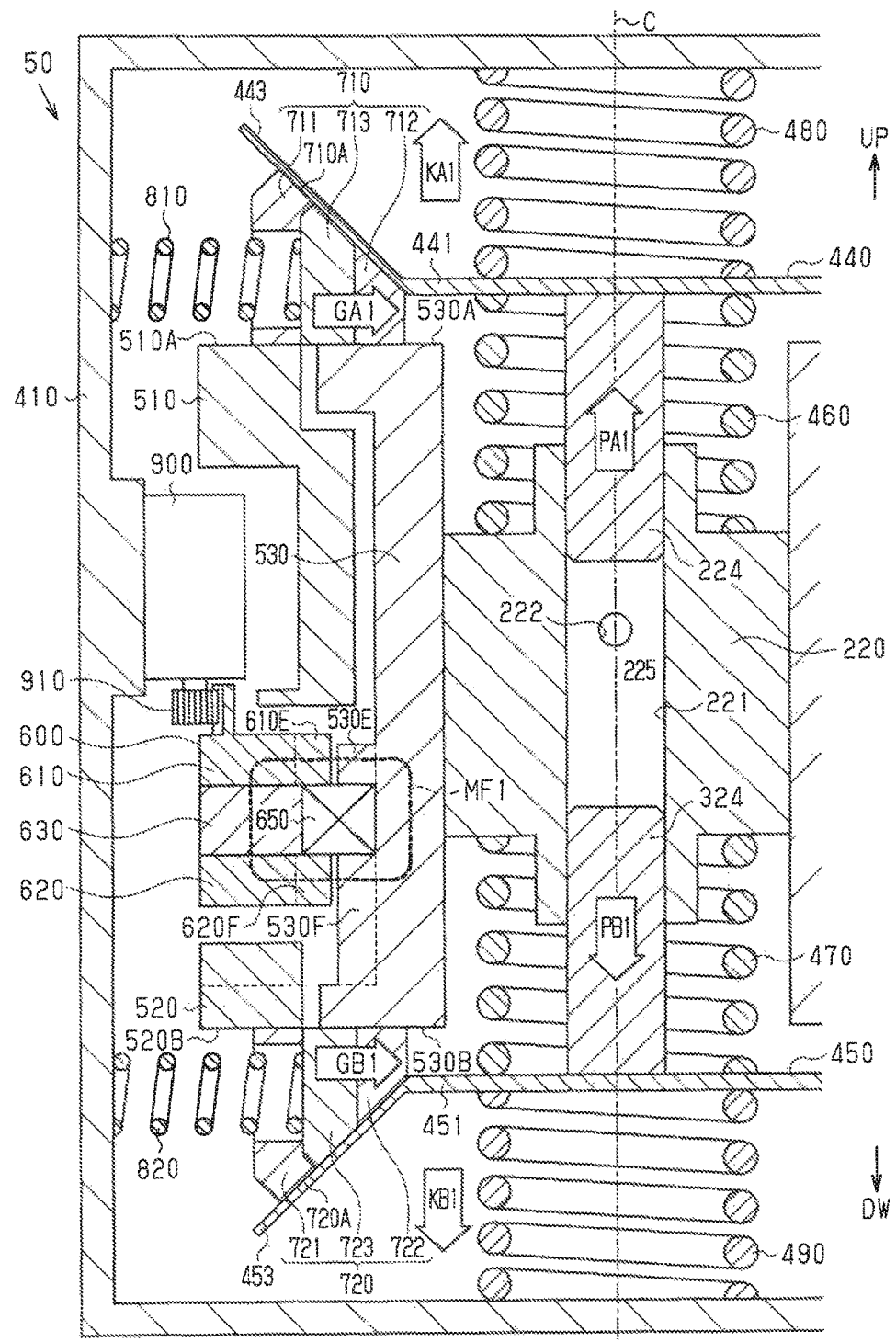
FIG. 18 is a sectional view illustrating a state inside the electric fuel pump at the time of fuel suction.

Accordingly, as illustrated in FIG. 18, in the first state, the first magnetic flux MF1 flows in a circular manner through the permanent magnet 630, the first ring 610, a part of the inner core 530 close to the rotational core 600, the second ring 620, and the permanent magnet 630. That is, an annular closed magnetic circuit is constituted by the part of the inner core 530 close to the rotational core 600 and the rotational core 600 including the permanent magnet 630. As a result, in the first state, the first outer core 510, the second outer core 520, the first movable core 710, the second movable core 720, the first movable element 440, and the second movable element 450 are not magnetized.

Since those members are not magnetized, a magnetic force of the permanent magnet 630 is not applied to the first movable element 440 and the second movable element 450 in the first state, and accordingly, the first movable element 440 and the second movable element 450 move away from each other by the urging forces of the first spring 460 and the second spring 470. That is, the first movable element 440 moves in a direction away from the pump body 220 (a direction of an arrow KA1 illustrated in FIG. 18) by the urging force of the first spring 460 and the second movable element 450 also moves in a direction away from the pump body 220 (a direction of an arrow KB1 illustrated in FIG. 18) by the urging force of the second spring 470.

When the first movable element 440 moves in the direction away from the pump body 220 by the urging force of the first spring 460, the first inclined surface 443 of the first movable element 440 moves in a direction away from the upper end surface 530A of the inner core 530 and the upper end surface 510A of the first outer core 510. At this time, due to the urging force of the third spring 810, each first movable core 710 moves in a direction toward the central axis C (a direction of an arrow GA1 illustrated in FIG. 18) in the radial direction of the first plunger 224, while the first movable core 710 is maintained in a state where the first inclined surface 443 of the first movable element 440 makes contact with the third inclined surface 710A of the first movable core 710. Even in a case where the first inclined surface 443 moves in the direction away from the upper end surface 530A of the inner core 530 and the upper end surface 510A of the first outer core 510, the first movable core 710 is maintained in contact with the first inclined surface 443 of the first movable element 440, the upper end surface 530A of the inner core 530, and the upper end surface 510A of the first outer core 510 while the first movable core 710 moves in the radial direction of the first plunger 224.

Similarly, when the second movable element 450 moves in the direction away from the pump body 220 due to the urging force of the second spring 470, the second inclined surface 453 of the second movable element 450 moves in a direction away from the lower end surface 530B of the inner core 530 and the lower end surface 520B of the second outer core 520. At this time, due to the urging force of the fourth spring 820, each second movable core 720 moves in a direction toward the central axis C (a direction of an arrow GB1 illustrated in FIG. 18) in the radial direction of the second plunger 324, while the second movable core 720 is maintained in a state where the second inclined surface 453 of the second movable element 450 makes contact with the fourth inclined surface 720A of the second movable core 720. Even in a case where the second inclined surface 453 moves in the direction away from the lower end surface 530B of the inner core 530 and the lower end surface 520B of the second outer core 520, the second movable core 720 is maintained in contact with the second inclined surface 453 of the second movable element 450, the lower end surface 530B of the inner core 530, and the lower end surface 520B of the second outer core 520, while the second movable core 720 moves in the radial direction of the second plunger 324.

As described above, when the first movable element 440 moves in the direction of the arrow KA1, the first plunger 224 connected to the first flat portion 441 of the first movable element 440 moves in a direction (a direction of an arrow PA1 illustrated in FIG. 18) where a volume of the compression chamber 225 increases. Similarly, when the second movable element 450 moves in the direction of the arrow KB1, the second plunger 324 connected to the second flat portion 451 of the second movable element 450 also moves in a direction (a direction of an arrow PB1 illustrated in FIG. 18) Where the volume of the compression chamber 225 increases. When the first plunger 224 moves in the direction of the arrow PA1 and the second plunger 324 moves in the direction of the arrow PB1 as described above, a pressure in the compression chamber 225 decreases, so that the fuel is sucked into the compression chamber 225 through the low-pressure fuel passage 12, the first check valve 228, and the intake passage 222.

Next will be described an operation of the fuel pump 50 at the time of fuel discharge. As illustrated in FIG. 16, in the second state, the third gap SA between the third projection portion 510G of the first outer core 510 and the sixth projection portion 610G of the first ring 610 is narrower than the gap S5 between the inner peripheral surface 610C of the first ring 610 and the first projection portion 530E of the inner core 530. Further, the fourth gap SB between the fourth projection portion 520H of the second outer core 520 and the eighth projection portion 620H of the second ring 620 is narrower than the gap S6 between the inner peripheral surface 620C of the second ring 620 and the second projection portion 530F of the inner core 530.

Accordingly, as indicated by an alternate long and two short dashes line in FIG. 16, a second magnetic flux MF2 indicating a flow of a magnetic flux generated from the permanent magnet 630 of the rotational core 600 in the second state passes through the third gap SA having a shorter distance and a smaller magnetic resistance than those of the gap S5, and the fourth gap SB having a shorter distance and a smaller magnetic resistance than those of the gap S6.

Figure 19:
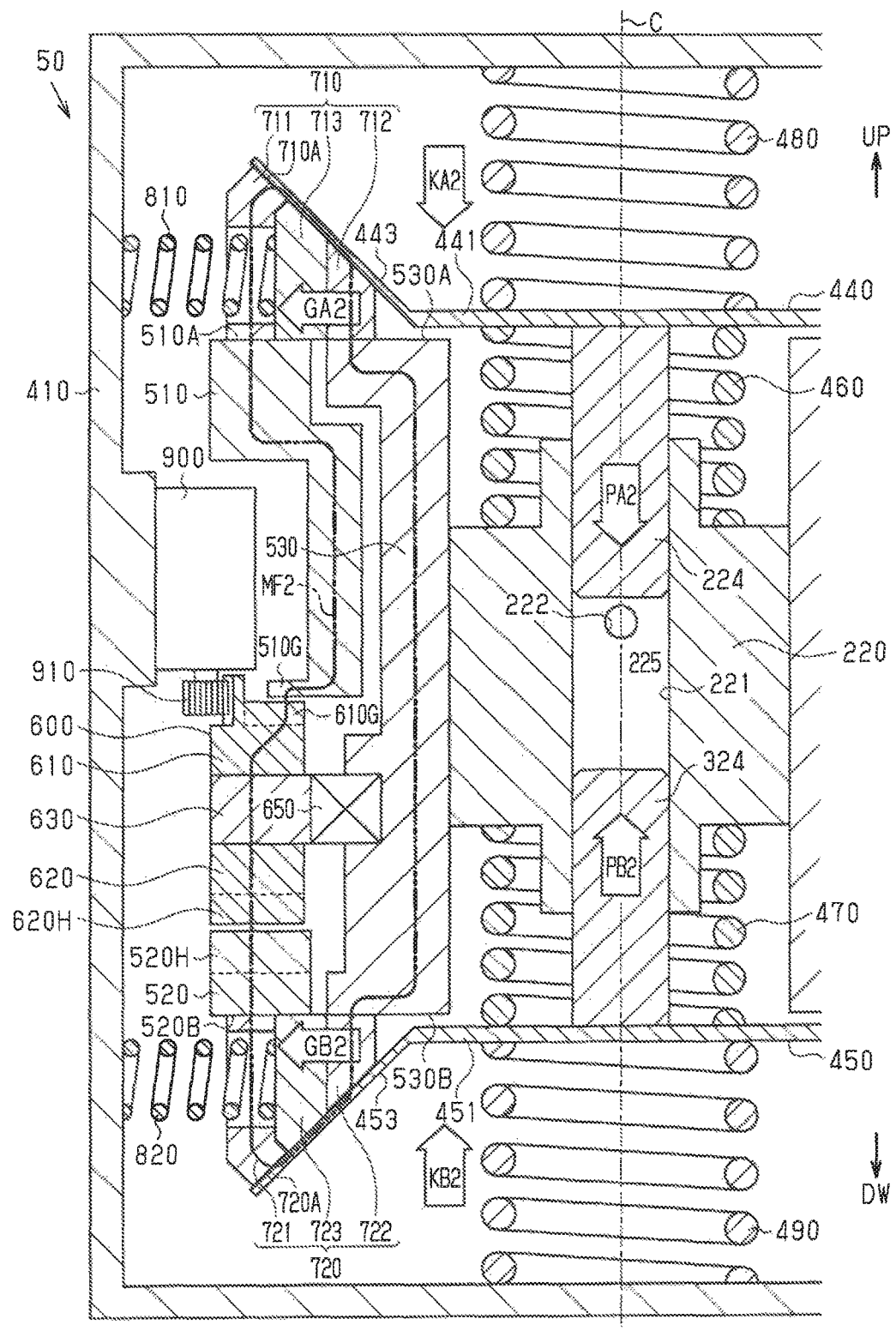
FIG. 19 is a sectional view illustrating a state inside the electric fuel pump at the time of fuel discharge.

Accordingly, as illustrated in FIG. 19, the second magnetic flux. MF2 flows in the second state as follows. That is, the second magnetic flux MF2 flows in a circular manner through the permanent magnet 630, the first ring 610, the first outer core 510, the first magnetic portion 711 of the first movable core 710, the first inclined surface 443 of the first movable element 440, the second magnetic portion 712 of the first movable core 710, the inner core 530, the second magnetic portion 722 of the second movable core 720, the second inclined surface 453 of the second movable element 450, the first magnetic portion 721 of the second movable core 720, the second outer core 520, the second ring 620, and the permanent magnet 630. That is, an annular closed magnetic circuit is constituted by the rotational core 600 including the permanent magnet 630, the first outer core 510, the first movable core 710, the first inclined surface 443 of the first movable element 440, the inner core 530, the second movable core 720, the second inclined surface 453 of the second movable element 450, and the second outer core 520. Accordingly, in the second state, the first outer core 510, the second outer core 520, the inner core 530, the first movable core 710, the second movable core 720, the first movable element 440, and the second movable element 450 are magnetized.

Since a magnetic force of the permanent magnet 630 is applied to the first movable element 440 and the second movable element 450 in the second state as described above, the first movable element 440 moves in a direction (a direction of an arrow KA2 illustrated in FIG. 19) toward the pump body 220, and the second movable element 450 also moves in a direction (a direction of an arrow KB2 illustrated in FIG. 19) toward the pump body 220. Accordingly, the first movable element 440 and the second movable element 450 move to approach each other.

Further, the first inclined surface 443 of the first movable element 440 is attracted to the third inclined surface 710A of each first movable core 710 thus magnetized. When the first movable element 440 moves in the direction toward the pump body 220 in a state where the first inclined surface 443 is attracted to the third inclined surface 710A due to the magnetic force as described above, the first movable core 710 moves in a direction (a direction of an arrow GA2 illustrated in FIG. 19) away from the central axis C in the radial direction of the first plunger 224 due to a component force of a force applied to the third inclined surface 710A from the first inclined surface 443 of the first movable element 440. When the first movable element 440 moves in the direction toward the pump body 220 as described above, the first movable core 710 is maintained in a state where the first movable core 710 is attracted to the first inclined surface 443 of the first movable element 440, the first outer core 510, and the inner core 530 while the first movable core 710 moves in the radial direction of the first plunger 224.

Similarly, the second inclined surface 453 of the second movable element 450 is attracted to the fourth inclined surface 720A of each second movable core 720 thus magnetized. When the second movable element 450 moves in a direction toward the pump body 220 in a state where the second inclined surface 453 is attracted to the fourth inclined surface 720A due to the magnetic force as described above, the second movable core 720 moves in a direction (a direction of an arrow GB2 illustrated in FIG. 19) away from the central axis C in a radial direction of the second plunger 324 due to a component force of a force applied to the fourth inclined surface 720A from the second inclined surface 453 of the second movable element 450. When the second movable element 450 moves in the direction toward the pump body 220 as described above, the second movable core 720 is maintained in a state where the second movable core 720 is attracted to the second inclined surface 453 of the second movable element 450, the second outer core 520, and the inner core 530 while the second movable core 720 moves in the radial direction of the second plunger 324.

As described above, when the first movable element 440 moves in the direction of the arrow KA2, the first plunger 224 connected to the first flat portion 441 of the first movable element 440 moves in a direction (a direction of an arrow PA2 illustrated in FIG. 19) where the volume of the compression chamber 225 decreases. Similarly, when the second movable element 450 moves in the direction of the arrow KB2, the second plunger 324 connected to the second flat portion 451 of the second movable element 450 moves in a direction (a direction of an arrow PB2 illustrated in FIG. 19) where the volume of the compression chamber 225 decreases. When the first plunger 224 moves in the direction of the arrow PA2 and the second plunger 324 moves in the direction of the arrow PB2 as described above, the pressure in the compression chamber 225 increases. The fuel in the compression chamber 225 is pressurized and discharged to the high-pressure fuel passage 19 through the discharge passage 223 (illustrated in FIG. 3 described above) and the second check valve 229.

When the state is alternately switched between the first state and the second state along with the rotation of the rotational core 600, the fuel thus pressurized is continuously discharged from the fuel pump 50. Further, as the rotation speed of the rotational core 600 is increased, the number of times per unit time that the state is switched between the first state and the second state increases and the number of times of reciprocation of the first plunger 224 and the second plunger 324 per unit time increases. Accordingly a discharge amount of the fuel pump 50 increases. In view of this, the control device 100 sets the rotation speed of the electric motor 900 that rotationally drives the rotational core 600 (i.e., that rotates the rotational core 600), based on a required discharge amount of the fuel pump 50. That is, the control device 100 adjusts the rotation speed of the electric motor 900 such that the rotation speed is higher as the required discharge amount is larger, thereby adjusting the discharge amount of the fuel pump 50 to achieve the required discharge amount (i.e., the desired discharge amount).

Note that a switching portion may include the projection portions including the first projection portion 530E to the eighth projection portion 620H, which yield the above effects. The switching portion is configured to switch between the first state and the second state when the rotational phase of the rotational core is changed, the first state being a state where the magnetic force of the permanent magnet is not applied to the movable element, and the second state being a state where the magnetic force of the permanent magnet is applied to the movable element.

Next, effects of the fuel pump 50 will be described. Generally, in a plunger fuel pump, a high pressure is applied to a plunger from fluid in a compression chamber. Therefore, when the plunger is to be moved by a magnetic force of an electromagnet, a strong magnetic force is required in general, and thus, electric power consumed by the electromagnet increases.

In contrast, in the fuel pump 50 according to the present embodiment, the operation of discharging the fuel by reciprocating the first plunger 224 and the second plunger 324 is performed by rotating the rotational core 600 with the use of the electric motor 900.

In the case of the fuel pump 50, since the magnetic force for moving the first plunger 224 and the second plunger 324 in the direction toward the pump body 220 is generated from the permanent magnet 630, electric power for obtaining the magnetic force is not necessary. Accordingly, the discharge operation requires only electric power consumed by the electric motor 900 to rotate the rotational core 600. In general, the electric power consumed by the electric motor 900 to rotate the rotational core 600 is much smaller than the electric power consumed by the electromagnet.

For example, in the fuel pump 50, as the rotational resistance of the rotational core 600 becomes smaller, the electric power consumed by the electric motor 900 becomes smaller. The rotational resistance of the rotational core 600 includes friction generated in the bearing 650, and the like. Since such friction generated in the bearing is very small, the electric power consumed by the electric motor 900 to rotate the rotational core 600 against the friction is very small, Further, as the rotational resistance of the rotational core 600, there are also the following resistances, for example. That is, as illustrated in FIG. 15, in a state where the first projection portion 530E of the inner core 530 faces the fifth projection portion 610E of the first ring 610, the first projection portion 530E and the fifth projection portion 610E are attracted to each other by the first magnetic flux MF1. Accordingly, when the first projection portion 530E is separated from the magnetic field of the first magnetic flux MF1 at the time when the fifth projection portion 610E moves away from the first projection portion 530E along with the rotation of the rotational core 600, the fifth projection portion 610E and the first projection portion 530E are drawn to each other. This increases the rotational resistance of the rotational core 600. However, an increase in the consumed electric power, which is caused due to the increase in the rotational resistance, can be generally offset by the following reason.

That is, when the first projection portion 530E of the inner core 530 is about to face the fifth projection portion 610E of the first ring 610, the fifth projection portion 610E approaches the first projection portion 530E along with the rotation of the rotational core 600. At this time, when the first projection portion 530E enters the magnetic field of the first magnetic flux MF1, the fifth projection portion 610E and the first projection portion 530E are drawn to each other. Accordingly, a force for promoting the rotation of the rotational core 600 is applied to the rotational core 600, and thus, the electric power consumed by the electric motor 900 decreases. Accordingly, if the separation from the magnetic field of the first magnetic flux MF1 and the entry into the magnetic field are regarded as one set, the increase in the consumed electric power at the time of the separation from the magnetic field is generally offset by the decrease in the consumed electric power at the time of the entry into the magnetic field. Accordingly, when the rotational core 600 rotates, the increase in the consumed electric power due to the separation from the magnetic field is suppressed.

Note that the effect at the time of the separation from the magnetic field and the effect at the time of the entry into the magnetic field can be obtained in a combination of the first projection portion 530E of the inner core 530 and the fifth projection portion 610E of the first ring 610, and in a combination of the second projection portion 530F of the inner core 530 and the seventh projection portion 620F of the second ring 620. Similarly, such effects can be also obtained in a combination of the third projection portion 510G of the first outer core 510 and the sixth projection portion 610G of the first ring 610 and in a combination of the fourth projection portion 520H of the second outer core 520 and the eighth projection portion 620H of the second ring 620, as illustrated in FIG. 16.

Further, in the first state, the first movable element 440 and the second movable element 450 move away from each other, as illustrated in FIG. 18. In the second state, the first movable element 440 and the second movable element 450 move to approach each other, as illustrated in FIG. 19.

Accordingly, when the first state and the second state are repeated due to the rotation of the rotational core 600, the first movable element 440 reciprocates, and the second movable element 450 functioning as a counterweight for the first movable element 440 moves in a direction opposite to a moving direction of the first movable element 440, in synchronization with the first movable element 440. Therefore, the vibration caused due to the reciprocation of the first movable element 440 is canceled by the vibration caused due to the reciprocation of the second movable element 450.

As illustrated in FIGS. 18 and 19, when each first movable core 710 moves in the direction toward the central axis C or the direction away from the central axis C in the radial direction of the first plunger 224 along with the movement of the first movable element 440, the state where the first movable core 710 makes contact with the first inclined surface 443 of the first movable element 440, the inner core 530, and the first outer core 510 is maintained. Accordingly, no air gap occurs at all times between the first movable element 440 and the inner core 530 and between the first movable element 440 and the first outer core 510. This makes it possible to prevent the magnetic force of the permanent magnet 630, which is applied to the first movable element 440, from being decreased due to the air gap.

Similarly, when each second movable core 720 moves in the direction toward the central axis C or the direction away from the central axis C in the radial direction of the second plunger 324 along with the movement of the second movable element 450, the state where the second movable core 720 makes contact with the second inclined surface 453 of the second movable element 450, the inner core 530, and the second outer core 520 is maintained. Accordingly, no air gap occurs at all times between the second movable element 450 and the inner core 530 and between the second movable element 450 and the second outer core 520. This makes it possible to prevent the magnetic force of the permanent magnet 630, which is applied to the second movable element 450, from being decreased due to the air gap.

As described above, a part of a magnetic circuit that attracts the first inclined surface 443 of the first movable element 440 is constituted by the first magnetic portion 711 and the second magnetic portion 712 of the first movable core 710. At the time when the first movable core 710 moves in the radial direction of the first plunger 224, the first magnetic portion 711 constantly makes contacts with the first outer core 510 and the second magnetic portion 71.2 constantly makes contact with the inner core 530. Accordingly, when the first movable core 710 moves, the magnetic circuit that attracts the first inclined surface 443 can be maintained in a connected state without being cut. Therefore, it is possible to maintain a state where a strong magnetic force is applied to the first inclined surface 443.

Similarly, a part of a magnetic circuit that attracts the second inclined surface 453 of the second movable element 450 is constituted by the first magnetic portion 721 and the second magnetic portion 722 of the second movable core 720. At the time when the second movable core 720 moves in the radial direction of the second plunger 324, the first magnetic portion 721 constantly makes contact with the second outer core 520 and the second magnetic portion 722 constantly makes contact with the inner core 530. Accordingly, when the second movable core 720 moves, the magnetic circuit that attracts the second inclined surface 453 can be maintained in a connected state without being cut. Therefore, it is possible to maintain a state where a strong magnetic force is applied to the second inclined surface 453.

As described above, according to the above embodiment, it is possible to yield the following effects. (1) The fuel pump 50 is caused to perform a discharge operation by rotationally driving the rotational core 600 with the use of the electric motor 900. Thus, it is possible to reduce the consumed electric power as compared to a case where a plunger is moved by a magnetic force of an electromagnet.

(2) The protruding amounts of the first projection portion 530E and the fifth projection portion 610E are set such that the first gap UA is narrower than the gap S3. Further, the protruding amounts of the second projection portion 530F and the seventh projection portion 620F are set such that the second gap UB is narrower than the gap S4. Accordingly, when the first projection portion 530E faces the fifth projection portion 610E and the second projection portion 530F faces the seventh projection portion 620F, it is possible to cause the first state where the magnetic force of the permanent magnet 630 is not applied to the first movable element 440 and the second movable element 450.

Further, the protruding amounts of the third projection portion 510G and the sixth projection portion 610G are set such that the third gap SA is narrower than the gap S5. Further, the protruding amounts of the fourth projection portion 520H and the eighth projection portion 620H are set such that the fourth gap SB is narrower than the gap S6.

Accordingly, when the third projection portion 510G faces the sixth projection portion 610G and the fourth projection portion 520H faces the eighth projection portion 620H, it is possible to cause the second state where the magnetic force of the permanent magnet 630 is applied to the first movable element 440 and the second movable element 450.

(3) The first movable element 440 and the second movable element 450 functioning as the counterweight are configured to reciprocate in synchronization with each other. Therefore, the vibration caused due to the reciprocation of the first movable element 440 can be canceled by the vibration caused due to the reciprocation of the second movable element 450.

(4) Since the first movable core 710 and the second movable core 720 are provided, it is possible to prevent the magnetic force of the permanent magnet 630. Which is applied to the first movable element 440 and the second movable element 450, from being decreased due to air gaps.

(5) The first movable core 710 includes the first magnetic portion 711, the second magnetic portion 712, and the nonmagnetic portion 713. Similarly, the second movable core 720 includes the first magnetic portion 721, the second magnetic portion 722, and the nonmagnetic portion 723. Accordingly, when the first movable core 710 and the second movable core 720 move in the radial direction of the first plunger 224 and the second plunger 324, the magnetic circuits that attract the first inclined surface 443 and the second inclined surface 453 can be maintained in a connected state without being cut.

Figure 20:
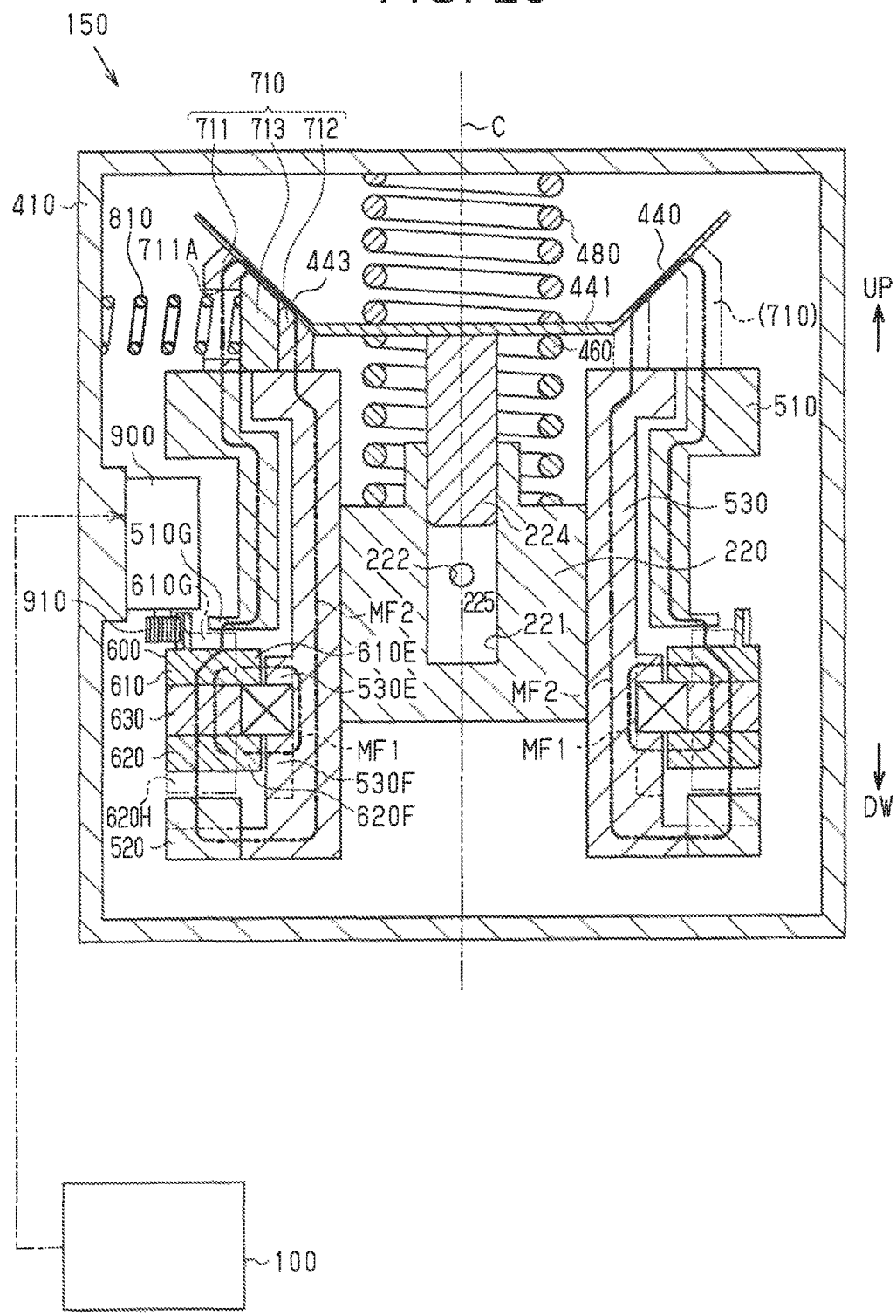
FIG. 20 is a sectional view of an electric fuel pump according to a modification of the embodiment.

Modifications may be made to the above-described embodiment as stated below. The second movable element 450 functioning as the counterweight for the first movable element 440 is provided in the embodiment, but the second movable element 450 may be omitted. An example of this modification is illustrated in FIG. 20. Note that a first movable core 710 indicated by an alternate long and two short dashes line in FIG. 20 is a first movable core 710 that is not seen in a section in this drawing and is indicated by a virtual line.

As illustrated in FIG. 20, as compared to the above fuel pump 50, a fuel pump 150 in the modification does not include the second plunger 324, the second movable element 450, the second spring 470, the fourth spring 820, the sixth spring 490, and the second movable core 720. Further, an inner core 530 in this modification is configured such that a second large-diameter portion 533 of the inner core 530 is connected to an inner peripheral surface of the second outer core 520, so that the above-described gap S2 is not provided. Note that the second outer core 520 may be provided integrally with the second large-diameter portion 533. A cylinder 221 of a pump body 220 does not have a through-hole, and is opened at only an insertion side for a first plunger 224.

Even in this modification, similarly to the above embodiment, when a rotational phase of a rotational core 600 is changed to cause the first state, a first magnetic flux MF1 where a magnetic force is not applied to the first movable element 440 is generated. Further, when the rotational phase of the rotational core 600 is changed to cause the second state, a second magnetic flux MF2 where a magnetic force is applied to the first movable element 440 is generated. Accordingly, the effect described in (1) and the effects of the first movable core 710 described in (3) and (4) can be obtained.

Figure 21:
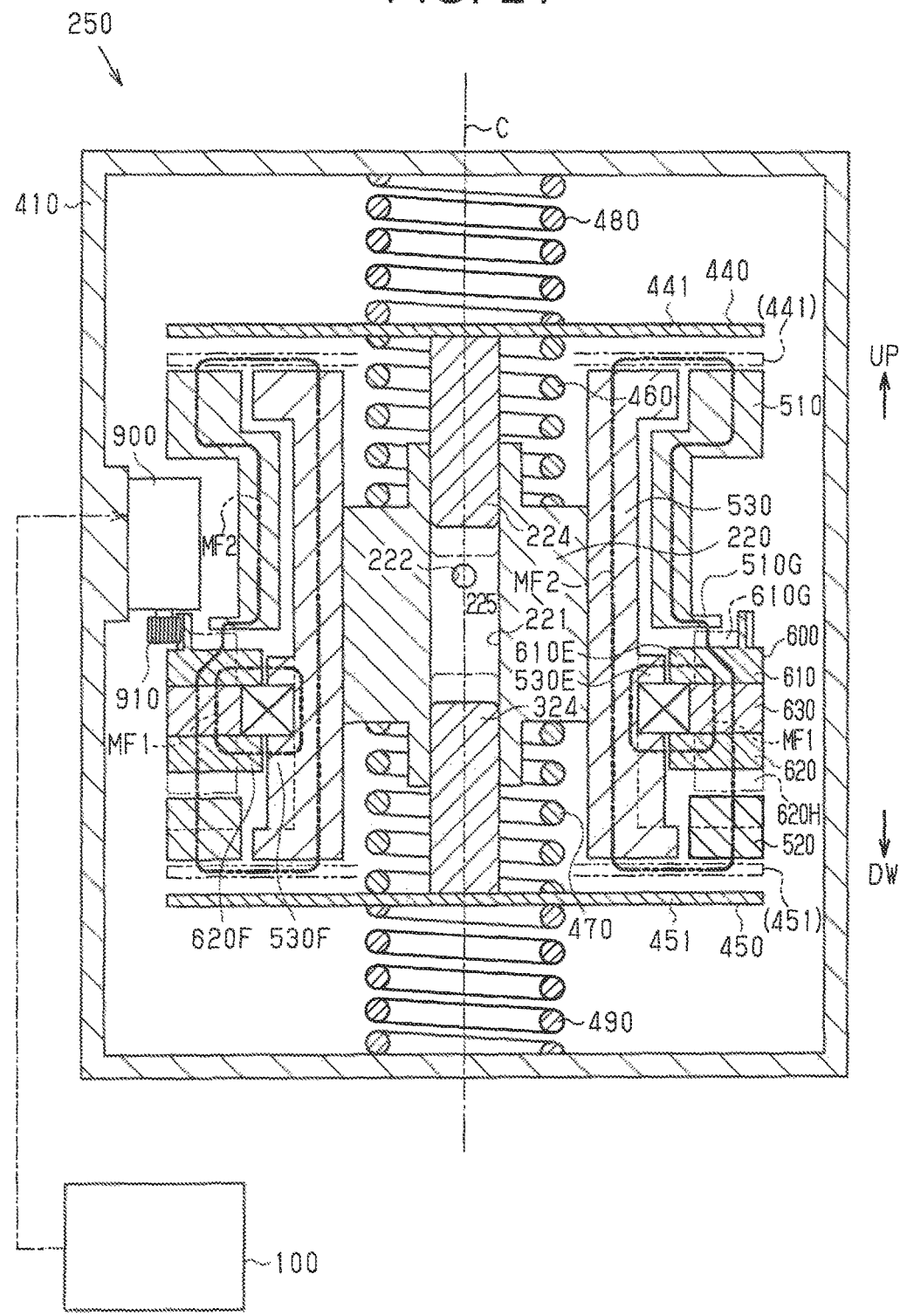
FIG. 21 is a sectional view of an electric fuel pump according to another modification of the embodiment.

The first movable core 710 and the second movable core 720 may be omitted. An example of this modification is illustrated in FIG. 21. As illustrated in FIG. 21, as compared to the above-described fuel pump 50, a fuel pump 250 in the modification does not include the first movable core 710, the second movable core 720, the third spring 810, and the fourth spring 820. Further, a first movable element 440 in this modification does not include the first inclined surface 443, and a disc-shaped first flat portion 441 expanding in parallel with a radial direction of the first movable element 440 is configured such that its outer periphery expands to an outer peripheral surface of a first outer core 510. Similarly, a second movable element 450 in this modification does not include the second inclined surface 453, and a disc-shaped second flat portion 451 expanding in parallel with a radial direction of the second movable element 450 is configured such that its outer periphery expands to an outer peripheral surface of a second outer core 520.

Even in this modification, similarly to the above embodiment, when a rotational phase of a rotational core 600 is changed to cause the first state, a first magnetic flux MF1 where a magnetic force is not applied to the first movable element 440 and the second movable element 450 is generated. Further, when the rotational phase of the rotational core 600 is changed to cause the second state, a second magnetic flux MF2 where a magnetic force is applied to the first movable element 440 and the second movable element 450 is generated. Accordingly, it is possible to yield the effects described in (1) and (2).

Note that the fuel pump 250 of this modification may be configured such that the second movable element 450 and members related to the second movable element 450 are omitted as illustrated in FIG. 20, and a shape of a cylinder 221 of a pump body 220 and a shape of an inner core 530 may be also changed to the shapes exemplified in FIG. 20. Even in this case, it is possible to yield the effect of (1).

The rotational core 600 includes three members such as the first ring 610, the second ring 620, and the permanent magnet 630 in the embodiment, but the entire rotational core 600 may be made of a permanent magnet. Further, the first ring 610 may be made of the permanent magnet, and thus, the first ring 610 may be provided integrally with the permanent magnet 630. Further, the second ring 620 may be made of the permanent magnet, and thus, the second ring 620 may be provided integrally with the permanent magnet 630.

Two first projection portions 530E to two eighth projection portions 620H are provided in the embodiment, but the number of each kind of projection portions may be changed appropriately. In the embodiment, the inner core 530, the first outer core 510, and the second outer core 520 are assembled such that the first projection portion 530E and the second projection portion 530F of the inner core 530, the third projection portion 510G of the first outer core 510, and the fourth projection portion 520H of the second outer core 520 are located in the same phase in the circumferential direction of the inner core 530. Further, the phase in which the fifth projection portion 610E of the first ring 610 and the seventh projection portion 620F of the second ring 620 are disposed is made different from the phase in which the sixth projection portion 610G of the first ring 610 and the eighth projection portion 620H of the second ring 620 are disposed, in the circumferential direction of the rotational core 600. This makes it possible to switch between the first state and the second state.

In another configuration, the phase in which the first projection portion 530E and the second projection portion 530F of the inner core 530 are disposed may be made different from the phase in which the third projection portion 510G of the first outer core 510 and the fourth projection portion 520H of the second outer core 520 are disposed, in the circumferential direction of the inner core 530. In addition, the fifth projection portion 610E of the first ring 610, the seventh projection portion 620F of the second ring 620, the sixth projection portion 610G of the first ring 610, and the eighth projection portion 620H of the second ring 620 may be disposed in the same phase in the circumferential direction of the rotational core 600. Even in this case, the state can be alternately switched between the first state and the second state by rotating the rotational core 600.

The shape of each of the members constituting the fuel pump 50 are an example and may be changed appropriately. In the embodiment, the fuel pump 50 is provided in the vicinity of the direct injection engine. However, a position of the fuel pump 50 can be changed appropriately. For example, the fuel pump 50 may be provided in the vicinity of the fuel tank 10 or may be provided inside the fuel tank 10.

What is claimed is:

1. A plunger electric fuel pump comprising:
   a cylinder;
   a plunger configured to reciprocate inside the cylinder;
   a pump body including a compression chamber that is defined by the cylinder and the plunger such that fuel in the compression chamber is pressurized by moving the plunger inside the cylinder;
   a movable element to which the plunger is connected;
   a fixed core provided so as to face the movable element;
   a rotational core including a permanent magnet configured to move the movable element in a direction toward the pump body by applying a magnetic force to the movable element;
   an electric motor configured to rotate the rotational core; and
   a spring configured to urge the movable element in a direction away from the pump body, wherein
   the rotational core and the fixed core are provided with a switching portion configured to switch between a first state and a second state when a rotational phase of the rotational core is changed, the first state being a state where the magnetic force of the permanent magnet is not applied to the movable element, and the second state being a state where the magnetic force of the permanent magnet is applied to the movable element.

2. The plunger electric fuel pump according to claim 1, wherein:
   the fixed core includes an inner core, and an outer core disposed so as to be distanced from an outer peripheral surface of the inner core;
   the switching portion includes a first protruding portion provided in the inner core, a second protruding portion provided in the outer core, a third protruding portion provided in the rotational core and projecting so as to face the first protruding portion of the inner core, and a fourth protruding portion provided in the rotational core and projecting so as to face the second protruding portion of the outer core;
   protruding amounts of the first protruding portion and the third protruding portion are set such that when the first protruding portion provided in the inner core faces the third protruding portion provided in the rotational core due to a change of the rotational phase of the rotational core, a gap between the first protruding portion and the third protruding portion is narrower than a gap between the rotational core and the outer core; and
   protruding amounts of the second protruding portion and the fourth protruding portion are set such that when the second protruding portion provided in the outer core faces the fourth protruding portion provided in the rotational core due to the change of the rotational phase of the rotational core, a gap between the second protruding portion and the fourth protruding portion is narrower than a gap between the rotational core and the inner core.

3. The plunger electric fuel pump according to claim 2, wherein:
   the rotational core has an annular shape;
   the third protruding portion is provided to protrude in a radial direction of the rotational core; and
   the fourth protruding portion is provided to protrude in a direction in which a central axis of the rotational core extends.

* * * * *